(12) United States Patent
Hirano et al.

(10) Patent No.: US 6,836,605 B2
(45) Date of Patent: Dec. 28, 2004

(54) OPTICAL FIBER PREFORM, PRODUCTION METHOD THEREOF, AND OPTICAL FIBER PRODUCED FROM THE PREFORM

(75) Inventors: Masaaki Hirano, Yokohama (JP); Eiji Yanada, Yokohama (JP); Masashi Onishi, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 99 days.

(21) Appl. No.: 10/291,813

(22) Filed: Nov. 12, 2002

(65) Prior Publication Data

US 2003/0145630 A1 Aug. 7, 2003

(30) Foreign Application Priority Data

Nov. 12, 2001 (JP) ........................................ 2001-346511

(51) Int. Cl.⁷ ................................................ G02B 6/02
(52) U.S. Cl. ...................................... 385/123; 65/428
(58) Field of Search .............................. 385/123; 65/428

(56) References Cited

U.S. PATENT DOCUMENTS

| | | | | |
|---|---|---|---|---|
| 4,154,591 A | * | 5/1979 | French et al. ................. | 65/428 |
| 4,596,589 A | * | 6/1986 | Perry .......................... | 65/412 |
| 4,636,236 A | * | 1/1987 | Glessner et al. ............. | 65/428 |
| 5,127,929 A | * | 7/1992 | Gunther et al. .............. | 65/382 |
| 5,298,047 A | | 3/1994 | Hart, Jr. et al. | |
| 5,735,927 A | * | 4/1998 | Sanghera et al. ............ | 65/389 |
| 6,076,376 A | | 6/2000 | Onishi et al. | |
| 6,408,652 B1 | * | 6/2002 | Okamura et al. ............. | 65/390 |
| 6,574,994 B2 | * | 6/2003 | Cain et al. ................... | 65/391 |
| 6,584,808 B1 | * | 7/2003 | Roba et al. .................. | 65/412 |
| 2003/0103748 A1 | * | 6/2003 | Hirano et al. ............... | 385/124 |

FOREIGN PATENT DOCUMENTS

| | | |
|---|---|---|
| JP | 5-142338 | 12/1976 |
| JP | 55-3369 | 1/1980 |
| JP | 57-118042 | 7/1982 |
| JP | 6-171970 | 6/1994 |
| JP | 9-243833 | 9/1997 |
| JP | 2001-247324 | 9/2001 |
| WO | WO 99/09437 | 2/1999 |

* cited by examiner

*Primary Examiner*—Mark Tremblay
(74) *Attorney, Agent, or Firm*—McDermott Will & Emery LLP

(57) ABSTRACT

An optical fiber preform having a low core noncircularity and eccentricity for producing an optical fiber having an improved polarization mode dispersion, a method for producing the preform, and an optical fiber produced from the preform. The optical fiber preform is produced by the following steps. Diameter-reduced portions $11a$ and $11b$ are formed in the vicinity of the ends of the glass pipe 11. A glass rod 12 is inserted into the glass pipe 11. The glass rod 12 is fixed to the glass pipe 11 at the diameter-reduced portion $11a$. The glass pipe 11 and the glass rod 12 are heat-unified from the diameter-reduced portion $11b$ forward to the diameter-reduced portion $11a$. The optical fiber preform has a core noncircularity of at most 1.5%. The optical fiber has a polarization mode dispersion of at most 0.15 $ps/km^{1/2}$ at a wavelength of 1,550 nm.

13 Claims, 10 Drawing Sheets

OPTICAL FIBER PREFORM, PRODUCTION METHOD THEREOF, AND OPTICAL FIBER PRODUCED FROM THE PREFORM

BACKGROUND OF THE INVENTION

1. Field of the Invention

The present invention relates to an optical fiber preform, a method for producing the preform, and an optical fiber produced from the preform.

2. Description of the Background Art

In the case of a method known as the rod-in collapse method, a glass rod is inserted into a glass pipe to be heated together so that the two members can be unified. The method is suitable for producing a preform for an optical fiber having a complicated refractive-index profile, such as a dispersion-compensating fiber or a dispersion-shifted fiber.

With the rod-in collapse method, when a glass rod is inserted into a glass pipe, the center axis of the glass rod must be in precise alignment with that of the glass pipe. If the alignment is insufficient, the core noncircularity or eccentricity of the optical fiber preform increases. Even when the alignment is sufficient just after the glass rod insertion, the alignment may be disturbed during the heat-unifying process, increasing the core noncircularity or eccentricity as well. When the glass rod bends in the glass pipe, a similar drawback is incorporated.

When an optical fiber is produced by drawing an optical fiber preform having a high core noncircularity or eccentricity, the optical fiber inevitably has an increased core noncircularity or eccentricity. This drawback degrades the polarization mode dispersion of the optical fiber. The inferior polarization mode dispersion degrades the pulse shape of signals, preventing high-bit rate optical transmission.

SUMMARY OF THE INVENTION

An object of the present invention is to offer an optical fiber preform having a low core noncircularity and eccentricity for producing an optical fiber having an improved polarization mode dispersion, a method for producing the preform, and an optical fiber produced from the preform.

According to the present invention, the foregoing and other objects and advantages are attained by offering an improved rod-in collapse method as a method for producing an optical fiber preform. The method comprises the following steps:

(a) a preparing step in which a glass pipe, a glass rod, and a heat source are prepared;

(b) a diameter-reduced-portion-forming step in which an inner diameter of the glass pipe is reduced at two longitudinal locations for forming a first diameter-reduced portion and a second diameter-reduced portion;

(c) a glass-rod-inserting step in which the glass rod is inserted into the glass pipe;

(d) a glass-rod-fixing step in which the glass rod is fixed to the glass pipe at the first diameter-reduced portion; and (e) a unifying step in which the glass pipe and the glass rod is heat-unified from the second diameter-reduced portion to the first diameter-reduced portion.

In this specification, the term "optical fiber preform" is used to mean a member to be drawn under the as-produced condition for producing an optical fiber or a member to be drawn for producing an optical fiber after being synthesized with a jacket over the circumference by an extra step such as the outside vapor deposition (OVD) method, the vapor phase axial deposition (VAD) method or the rod-in-tube method. Hereinafter, the latter member is referred to as an optical fiber preform intermediate.

The glass-rod-inserting step may comprise the following steps:

(a) inserting the glass rod into a protective pipe;

(b) inserting the protective pipe and the glass rod into the glass pipe; and (c) withdrawing the protective pipe from the glass pipe leaving the glass rod in the glass pipe.

In the diameter-reduced-portion-forming step, a third diameter-reduced portion may be formed at a location between the first and second diameter-reduced portions and adjacent to the first diameter-reduced portion.

In the glass-rod-fixing step, the glass rod may be fusion-fixed to the glass pipe at the first diameter-reduced portion such that the first diameter-reduced portion is provided with a portion between the glass pipe and the glass rod through which a gas can pass at a flow rate of V satisfying the equation $$V \geq \{(d_p/2)^2 \times \pi - (d_p/2)^2 \times \pi\} \times v,$$

where $d_p$ is the inner diameter of the glass pipe at the portion other than the diameter-reduced portions, $d_r$ is the diameter of the glass rod, and v is the moving speed of the heat source relative to the glass pipe.

Each of the glass pipe and the glass rod facing each other at the first diameter-reduced portion may be made of highly pure silica glass or silica glass doped with fluorine, diphosphorus pentaoxide ($P_2O_5$), or chlorine (Cl). In the above description, the term "highly pure silica glass" is used to mean silica glass having a purity of at least 99.9 mol %.

The first and second diameter-reduced portions and the glass rod may have a dimensional relationship expressed as $$d_r < D \leq d_r + 1 (\text{mm}),$$

where D is the inner diameter of the first and second diameter-reduced portions.

The glass pipe and the glass rod may have a dimensional relationship expressed as $$0.1(\text{mm}) \leq (d_p - d_r)/2 \leq 3(\text{mm}).$$

The following two conditions may be added to the production method:

(a) The glass pipe prepared in the preparing step comprises an effective glass pipe to become a portion of the optical fiber preform, a first auxiliary glass pipe connected to one end of the effective glass pipe, and a second auxiliary glass pipe connected to the other end of the effective glass pipe.

(b) In the diameter-reduced-portion-forming step, the first diameter-reduced portion is formed at the first auxiliary glass pipe, and the second diameter-reduced portion is formed at the second auxiliary glass pipe.

The following two conditions may be added to the production method:

(a) The glass rod prepared in the preparing step comprises an effective glass rod at least one end of which is connected to an auxiliary glass member made of highly pure silica glass or silica glass doped with fluorine, $P_2O_5$, or Cl. In this case, the effective glass rod is to become a portion of the optical fiber preform.

(b) In the glass-rod-fixing step, the auxiliary glass member is fixed to the glass pipe at the first diameter-reduced portion.

In this case, the auxiliary glass member may be a third auxiliary glass pipe so that the effective glass rod can be connected to the third auxiliary glass pipe by inserting the effective glass rod into the third auxiliary glass pipe.

In accordance with an aspect of the present invention, a method for producing an optical fiber preform comprises the following steps:

(a) a preparing step in which:
  (a1) an effective glass pipe to become a portion of the optical fiber preform, an auxiliary glass pipe, an effective glass rod to become a portion of the optical fiber preform, an auxiliary glass member made of highly pure silica glass or silica glass doped with fluorine, $P_2O_5$, or Cl. In this case, and a heat source are prepared;
  (a2) a glass pipe is assembled by connecting the auxiliary glass pipe to one end of the effective glass pipe; and
  (a3) a glass rod is assembled by connecting the auxiliary glass member to one end of the effective glass rod;
(b) a diameter-reduced-portion-forming step in which a first diameter-reduced portion is formed at the auxiliary glass pipe, and a second diameter-reduced portion is formed in the vicinity of the free end of the effective glass pipe;
(c) a glass-rod-inserting step in which the glass rod is inserted into the glass pipe;
(d) a glass-rod-fixing step in which the auxiliary glass member is fixed to the glass pipe at the first diameter-reduced portion; and
(e) a unifying step in which the glass pipe and the glass rod is heat-unified from the second diameter-reduced portion to the first diameter-reduced portion.

In accordance with another aspect of the present invention, an optical fiber preform having a core noncircularity of at most 1.5% is produced by a method comprising the following steps:

(a) a preparing step in which a glass pipe, a glass rod, and a heat source are prepared;
(b) a diameter-reduced-portion-forming step in which an inner diameter of the glass pipe is reduced at two longitudinal locations for forming a first diameter-reduced portion and a second diameter-reduced portion;
(c) a glass-rod-inserting step in which the glass rod is inserted into the glass pipe;
(d) a glass-rod-fixing step in which the glass rod is fixed to the glass pipe at the first diameter-reduced portion; and
(e) a unifying step in which the glass pipe and the glass rod is heat-unified from the second diameter-reduced portion to the first diameter-reduced portion.

In accordance with yet another aspect of the present invention, an optical fiber having a polarization mode dispersion of at most 0.15 ps/km$^{1/2}$ in a wavelength band of 1,550 nm is produced from an optical fiber preform having a core noncircularity of at most 1.5% and is produced by a method comprising the following steps:

(a) a preparing step in which a glass pipe, a glass rod, and a heat source are prepared;
(b) a diameter-reduced-portion-forming step in which an inner diameter of the glass pipe is reduced at two longitudinal locations for forming a first diameter-reduced portion and a second diameter-reduced portion;
(c) a glass-rod-inserting step in which the glass rod is inserted into the glass pipe;
(d) a glass-rod-fixing step in which the glass rod is fixed to the glass pipe at the first diameter-reduced portion; and
(e) a unifying step in which the glass pipe and the glass rod is heat-unified from the second diameter-reduced portion to the first diameter-reduced portion.

The present invention is further explained below by referring to the accompanying drawings. The drawings are provided solely for the purpose of illustration and are not intended to limit the scope of the invention.

DETAILED DESCRIPTION OF THE INVENTION

Figure 1:
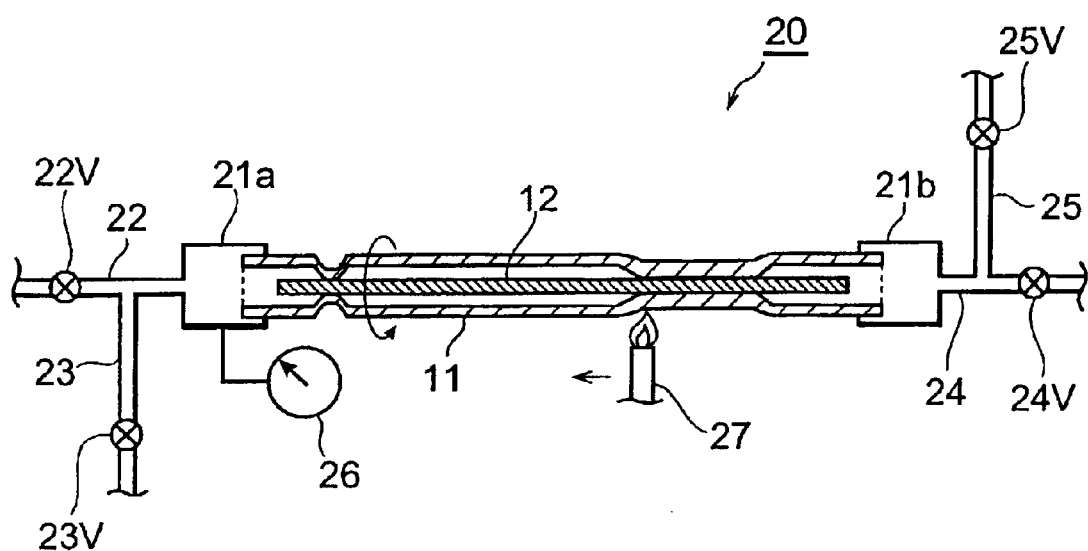
FIG. 1 is a schematic diagram showing an example of the heating apparatus to be used in the method for producing the optical fiber preform of the present invention.

Embodiments of the present invention are explained below by referring to the accompanying drawings. In the drawings, the same number refers to the same part to avoid duplicated explanation. The ratios of the dimensions in the drawings do not necessarily coincide with the explanation.

First, a heating apparatus suitable for the method of producing the optical fiber preform of the present invention is explained below. FIG. 1 is a schematic diagram showing an example of the heating apparatus. A heating apparatus 20 comprises the following components:

(a) rotating joints 21a and 21b that hold a glass pipe 11 such that the pipe 11 can be rotated;

(b) a gas-feeding tube 22 that is connected to the joint 21a and feeds a specified gas into the pipe 11;

(c) an evacuating tube 23 that branches off at a specified location from the gas-feeding tube 22;

(d) an exhaust tube 24 that exhausts the gas fed to the pipe 11;

(e) an auxiliary feeding tube 25 that merges with the exhaust tube 24;

(f) a pressure gauge 26 that is connected to the joint 21a and monitors the pressure inside the pipe 11;

(g) an evacuating apparatus (not shown in FIG. 1) that is connected to the evacuating tube 23; and (h) a heat source 27 that heat-unifies the pipe 11 and a glass rod 12.

The gas-feeding tube 22 is provided with a valve 22V, the evacuating tube 23 with a valve 23V, the exhaust tube 24 with a valve 24V, and the auxiliary feeding tube 25 with a valve 25V. The gas-feeding tube 22 can feed into the pipe 11 a gas such as chlorine gas ($Cl_2$), sulfur hexafluoride gas ($SF_6$), nitrogen gas ($N_2$), oxygen gas ($O_2$), or an inert gas. The auxiliary feeding tube 25 can feed a gas such as $Cl_2$, $N_2$, $O_2$, or an inert gas. When a gas is fed into the pipe 11, some of the valves 22V to 25V are closed and the other or others are opened. For example, when the valves 23V and 25V are closed and the valves 22V and 24V are opened, a specified gas can flow from the gas-feeding tube 22 via the rotating joint 21a, the pipe 11, the rotating joint 21b, and the exhaust tube 24 to an exhaust-gas-treating apparatus (not shown in FIG. 1). When the valves 22V, 24V, and 25V are closed and the valve 23V is opened, the pipe 11 can be evacuated for producing a vacuum. The evacuating apparatus can be an aspirator or a vacuum pump. The heat source 27 can move along the pipe 11 supported by the joints 21a and 21b. The heat source 27 can be an oxyhydrogen flame burner, a plasma burner or an electrical furnace.

(First Embodiment)

The first embodiment of the method for producing the optical fiber preform of the present invention is explained below. FIGS. 2A to 2G are longitudinal sectional views showing the steps of the production method of the first embodiment and the optical fiber preform at the end of each step or at the time of processing.

Figure 2A:
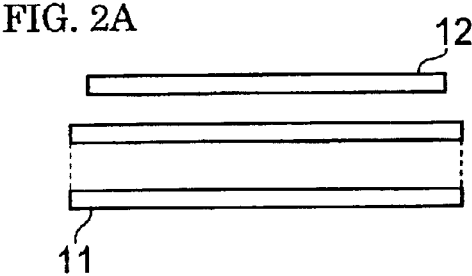
FIGS. 2A to 2G are longitudinal sectional views showing the steps of the production method of the first embodiment and the optical fiber preform at the end of each step or at the time of processing.

First, the pipe 11 and the rod 12 both made of silica glass are prepared as shown in FIG. 2A. They have a specified refractive index for producing an optical fiber having a required property. For example, a glass pipe made of silica glass doped with fluorine in a specified concentration may be combined with a glass rod made of silica glass doped with Cl in a specified concentration. The glass pipe made of fluorine-doped silica glass may also be combined with a glass rod made of highly pure silica glass.

(Diameter-Reduced-Portion-Forming Step)

After the pipe 11 and the rod 12 are prepared, the method described below forms a first diameter-reduced portion 11a in the vicinity of one end of the pipe 11 and a second diameter-reduced portion 11b in the vicinity of the other end. First, the pipe 11 is attached to the heating apparatus 20 shown in FIG. 1. Next, while $SF_6$ is fed into the pipe 11 from the gas-feeding tube 22, the pipe 11 is heated at about 1,500° C. with the heat source 27 to etch the inner surface of the pipe 11. The etching is carried out by moving the heat source 27 several times along the flow direction of the $SF_6$ while the pipe 11 is maintained rotating. This process etches the inner surface of the pipe 11 uniformly to provide the pipe 11 with a specified inner diameter.

It is desirable that the inner diameter of the pipe 11 after the etching and the diameter of the rod 12 satisfy the relationship $$0.1 \leq (d_p - d_r)/2 \leq 3 \text{ (mm)},$$

where $d_p$ is the inner diameter of the pipe 11, and $d_r$ is the diameter of the rod 12.

If the average value defined by $(d_p - d_r)/2$ is less than 0.1 mm, it is difficult to insert the rod 12 into the pipe 11, and gas bubbles may be formed between the pipe 11 and the rod 12 during the subsequent heat-unifying step described below. If the average value is more than 3 mm, it is difficult to reduce the diameter of the pipe 11 uniformly along its circumference during the subsequent heat-unifying step. As a result, the core noncircularity and eccentricity are increased. When the average value falls within the above-described limits, the foregoing problems can be prevented.

Figure 2B:
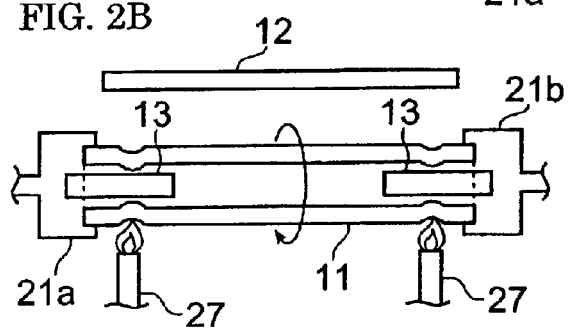

After the etching is finished, the rotating joints 21a and 21b are removed, and a dummy rod 13 is inserted into each end of the pipe 11. It is desirable that the dummy rod 13 be made of a high-melting-point ceramic that does not melt at the melting temperature of the silica glass. It is desirable that the diameter of the dummy rod 13 be larger than the diameter $d_r$ and not more than $d_r+1$ (mm). After the dummy rods 13 are inserted, the joints 21a and 21b are attached again to the pipe 11, and the air inside the pipe 11 is replaced with $Cl_2$. As shown in FIG. 2B, the portions of the pipe 11 where the dummy rods 13 are inserted are heated with the heat source 27. During this heating step, it is desirable that the pipe 11 be rotated to attain nearly uniform temperature distribution along its circumference. The diameter of the pipe 11 is reduced until the inner diameter becomes equal to the diameter of the dummy rod 13. Then, the dummy rods 13 are removed. Thus, the diameter-reduced portions 11a and 11b, which are reduced in diameter uniformly along the circumference, are formed in the vicinity of the ends of the pipe 11.

In this case, the inner diameter D of the diameter-reduced portions 11a and 11b are larger than the diameter $d_r$ of the rod 12. However, it is desirable that the difference between the inner diameter D and the diameter $d_r$ be not more than 1 mm. If the difference is more than 1 mm, it is difficult to support the rod 12 such that its center axis is aligned with that of the pipe 11. As a result, the eccentricity of the optical fiber preform is increased. When the inner diameter D falls within the above-described limits, the increase in the eccentricity can be prevented. It is more desirable that the difference between the inner diameter D and the diameter $d_r$ be not more than 0.5 mm. The inner diameter D can be controlled by adjusting the diameter of the dummy rods 13 to be inserted into the pipe 11 for forming the diameter-reduced portions 11a and 11b.

(Glass-Rod-Inserting Step)

Figure 2C:
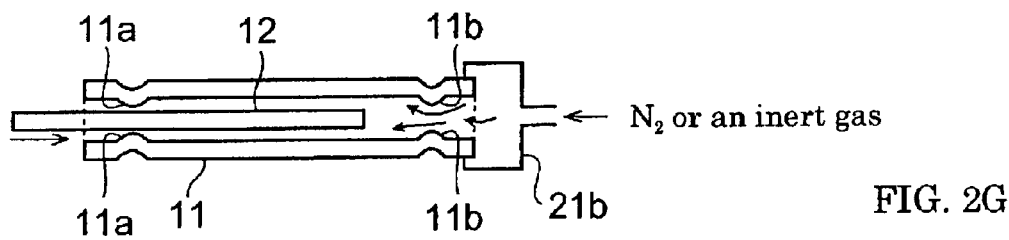

After the diameter-reduced portions 11a and 11b are formed, $N_2$ or an inert gas is fed into the pipe 11 from the auxiliary feeding tube 25 via the rotating joint 21b, and the rotating joint 21a is removed. Then, the rod 12 is inserted into the pipe 11 as shown in FIG. 2C. The feeding of the $N_2$ or inert gas can prevent the air from flowing into the pipe 11.

(Glass-Rod-Fixing Step)

Figure 2D:
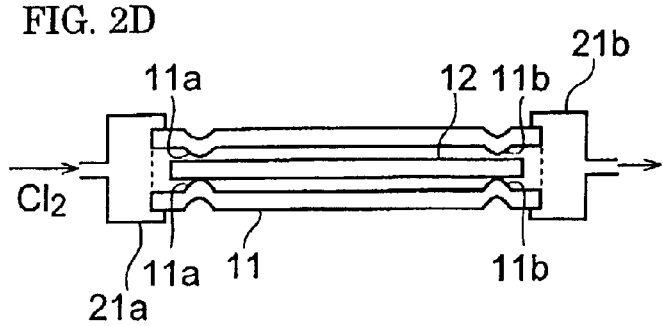
Figure 2E:
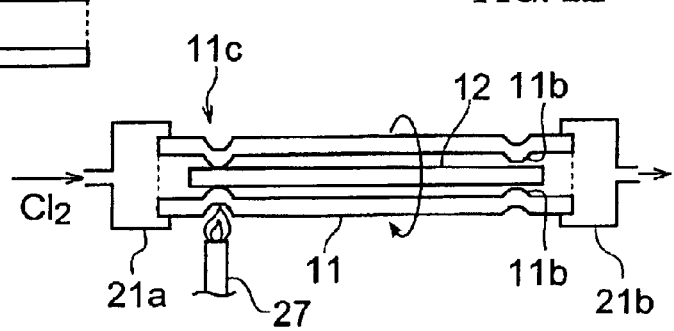

After the rod 12 is inserted into the pipe 11, the rotating joint 21a is attached to the pipe 11. As shown in FIG. 2D, the inserted rod 12 is supported by the diameter-reduced portions 11a and 11b. Subsequently, $Cl_2$ is fed into the pipe 11 at a specified flow rate from the gas-feeding tube 22 to replace the $N_2$ or inert gas with the $Cl_2$. While the $Cl_2$ is maintained flowing, the pipe 11 and the rod 12 are rotated to heat the diameter-reduced portion 11a with the heat source 27. The heating fuses the pipe 11 and the rod 12. This operation forms a fixing diameter-reduced portion 11c where the rod 12 is fixed by the pipe 11 as shown in FIG. 2E.

An unfused portion having a specified size must be provided between the rod 12 and the pipe 11 at the fixing diameter-reduced portion 11c, without fusing the entire circumference of the rod 12 with the pipe 11. The unfused portion allows the gas in the clearance between the pipe 11 and the rod 12 to escape to the outside of the pipe 11 when the pipe 11 and the rod 12 are heat-unified. Consequently, a pressure rise in the pipe 11 during the heat-unification can be prevented. As a result, inflation of the pipe 11 due to the pressure rise can be prevented. It is desirable that the size of the unfused portion be such that the gas can pass through the unfused portion at a greater speed than that of the decrease in the space between the rod 12 and the pipe 11 due to the heat-unification. More specifically, it is desirable that the flow rate of the gas passing through the unfused portion satisfy Eq. (1).

$$V \geq \{(d_p/2)^2 \times \pi - (d_r/2)^2 \times \pi\} \times v. \quad (1)$$

where V is the flow rate of the gas, and
v is the moving speed of the heat source 27.

(Unifying Step)

Figure 2F:
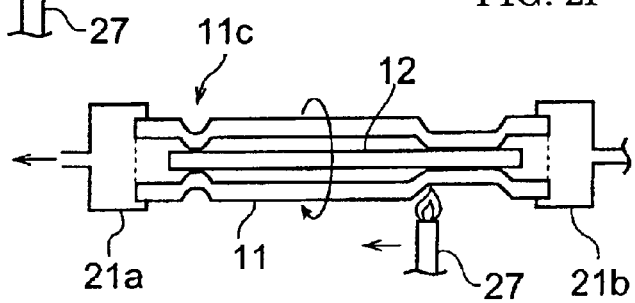
Figure 2G:
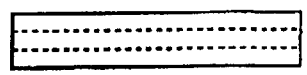

After the fixing diameter-reduced portion 11c provided with the above-described unfused portion is formed, the pipe 11 and the rod 12 are baked with the heat source 27. As with the operation for forming the fixing diameter-reduced portion 11c, $Cl_2$ is fed during the baking. The $Cl_2$ flows in the pipe 11 from the end nearer to the fixing diameter-reduced portion 11c through the unfused portion provided at the fixing diameter-reduced portion 11c to the other end. The pipe 11 and the rod 12 are rotated during the baking operation. After the baking is carried out for a specified time, while the pipe 11 and the rod 12 are maintained rotating, the diameter-reduced portion 11b is heated to unify the pipe 11 and the rod 12 over the entire circumference of the rod 12. Immediately after the unification, the pressure inside the pipe 11 is reduced to a specified vacuum degree. It is desirable that the vacuum degree be about −10 to about −0.1 kPa in the reading on the pressure gauge 26. As shown in FIG. 2F, while the pressure inside the pipe 11 is maintained under a reduced condition, the heat source 27 is moved from the diameter-reduced portion 11b forward to the fixing diameter-reduced portion 11c to heat the pipe 11 so that the pipe 11 and the rod 12 can be unified. Thus, an optical fiber preform 10 of the first embodiment is obtained as shown in FIG. 2G.

As explained above, in the production method of the optical fiber preform of the first embodiment, the rod 12 inserted in the pipe 11 is supported by the diameter-reduced portions 11a and 11b formed in the vicinity of the ends of the pipe 11. Consequently, the center axis of the rod 12 can be aligned with that of the pipe 11. This supporting method of the rod 12 enables the production of an optical fiber preform having low core noncircularity and eccentricity.

The present inventors found that while the heat unification of the rod 12 and the pipe 11 is performed, the fusion of the rod 12 and the pipe 11 usually generates a force that pulls the rod 12 toward the fusing portion. If the glass rod moves longitudinally, the glass rod changes its cross-sectional shape, and its center axis becomes out of alignment with that of the glass pipe. On the other hand, the present embodiment employs a method in which the rod 12 is fixed to the pipe 11 at the fixing diameter-reduced portion 11c, and the heat unification of the glass rod and the glass pipe proceeds from the diameter-reduced portion 11b, which is provided at the position opposite to the fixed portion, toward the fixed portion. Therefore, no longitudinal movement of the rod 12 occurs. As a result, decentering and other defects of the rod 12 due to the longitudinal movement during the heat unification can be prevented. Consequently, an increase in the core noncircularity and eccentricity of the optical fiber preform can be securely suppressed.

Figure 3A:
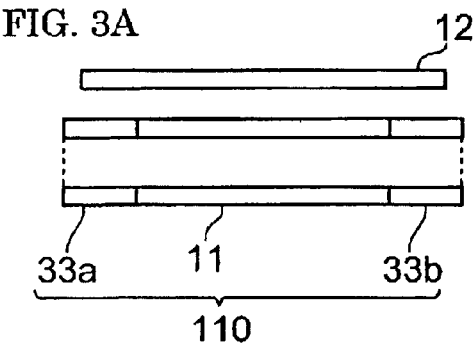
FIGS. 3A to 3F are longitudinal sectional views showing an example in which auxiliary glass pipes are connected to a glass pipe in the first embodiment.
Figure 3B:
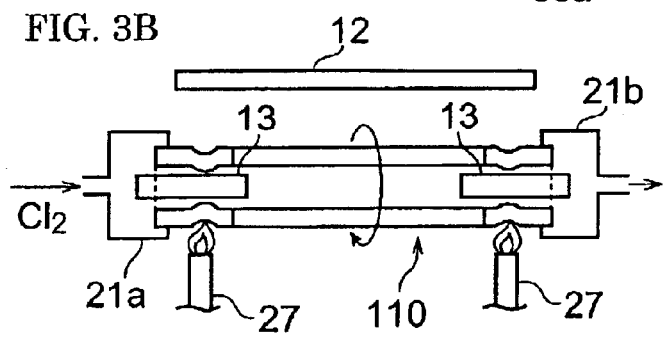

In the above description, the diameter-reduced portions are formed in the vicinity of the ends of the pipe 11. On the other hand, an auxiliary glass pipe may be connected to each end of the pipe 11 to form a diameter-reduced portion at each auxiliary glass pipe. The procedure for this method is explained below by referring to FIGS. 3A to 3F. First, auxiliary glass pipes 33a and 33b are prepared. Each of them is connected to one end of the pipe 11 such that the center axis of them is aligned with that of the pipe 11. Thus, a glass pipe 110 is obtained as shown in FIG. 3A. Next, while $SF_6$ is fed into the pipe 110, the pipe 110 is heated at about 1,500° C. with the heat source 27 to etch the inner surface of the pipe 110. It is desirable that the etching be carried out over a specified portion of the auxiliary pipes 33a and 33b. Subsequently, diameter-reduced portions 31a and 31b are formed as shown in FIG. 3B. The formation method of the diameter-reduced portions 31a and 31b is the same as that of the above-described diameter-reduced portions 11a and 11b. As shown in FIG. 3B, the diameter-reduced portions 31a and 31b are formed at the auxiliary pipes 33a and 33b.

Figure 3C:
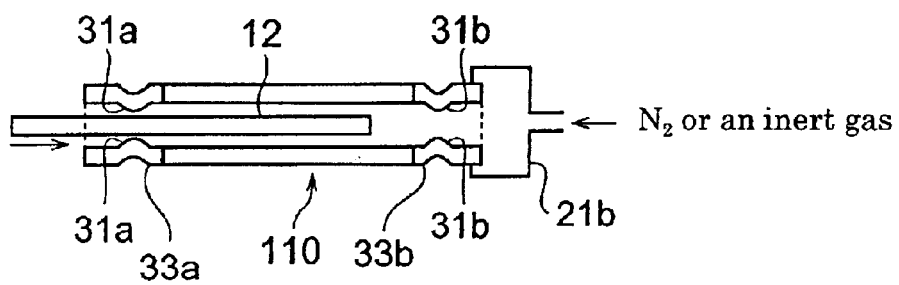
Figure 3D:
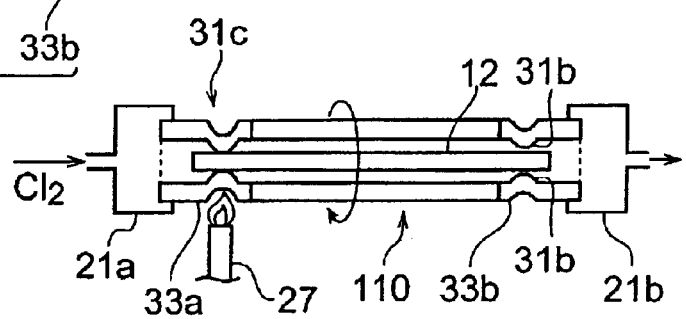
Figure 3E:
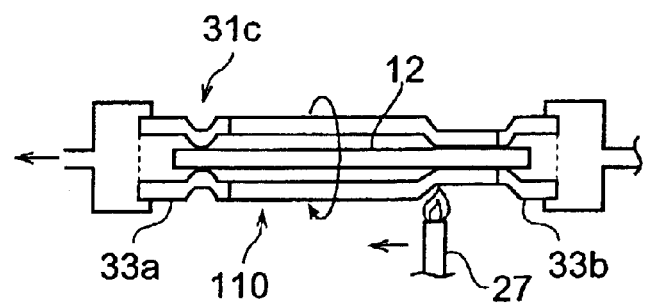
Figure 3F:
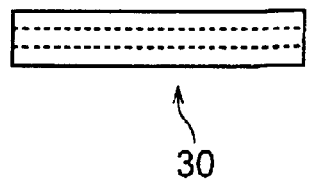

Next, the rod 12 is inserted into the pipe 110 as shown in FIG. 3C. The rod 12 is fusion-fixed to the auxiliary pipe 33a at the diameter-reduced portion 31a as shown in FIG. 3D. In other words, a fixing diameter-reduced portion 31c is formed at the place of the diameter-reduced portion 31a. After the fusion-fixing is performed, while the pipe 110 and the rod 12 are rotated, the heat source 27 is moved from the diameter-reduced portion 31b forward to the foxing diameter-reduced portion 31c to heat-unify the rod 12 and the pipe 110 as shown in FIG. 3E. Thus, an optical fiber preform 30 is obtained as shown in FIG. 3F. In this arrangement, the auxiliary glass pipes are connected to the pipe 110 such that the center axis of them is aligned with that of the pipe 110. Therefore, the center axis of the rod 12 supported in the pipe 110 at the diameter-reduced portions is also aligned with that of the pipe 11. In addition, the rod 12 is fixed at the fixing diameter-reduced portion 31c. Consequently, the heat unification can be performed under the condition in which the center axes of the glass rod and the glass pipe are aligned with each other, and no longitudinal movement of the glass rod occurs. As a result, the core noncircularity and eccentricity of the optical fiber preform can be reliably reduced.

(Second Embodiment)

The second embodiment of the method for producing the optical fiber preform of the present invention is explained below. FIGS. 4A to 4H are longitudinal sectional views showing the steps of the production method of the second embodiment and the optical fiber preform at the end of each step or at the time of processing.

The second embodiment is much the same as the first embodiment except that the glass rod is inserted into the glass pipe by a different method. The different aspects are mainly explained below.

Figure 4A:
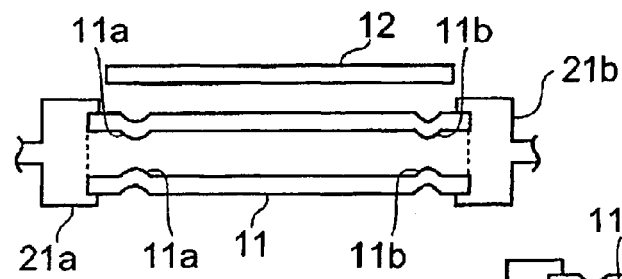
FIGS. 4A to 4H are longitudinal sectional views showing the steps of the production method of the second embodiment and the optical fiber preform at the end of each step or at the time of processing.
Figure 4B:
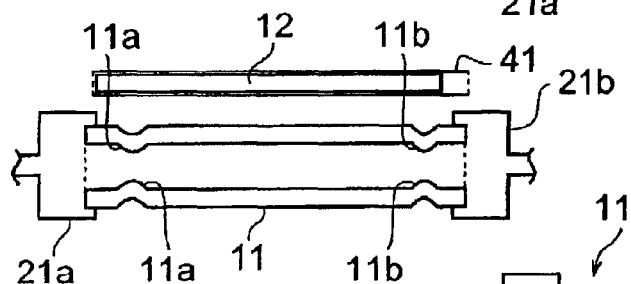

First, as shown in FIG. 4A, a glass pipe 11 is provided with diameter-reduced portions 11a and 11b by a procedure similar to that explained in the first embodiment. As shown in FIG. 4B, a glass rod 12 is inserted into a protective pipe 41, which is prepared in advance. The protective pipe 41 has an inner diameter that allows the insertion of the rod 12 and an outer diameter that allows the protective pipe 41 to be inserted into the pipe 11.

Figure 4C:
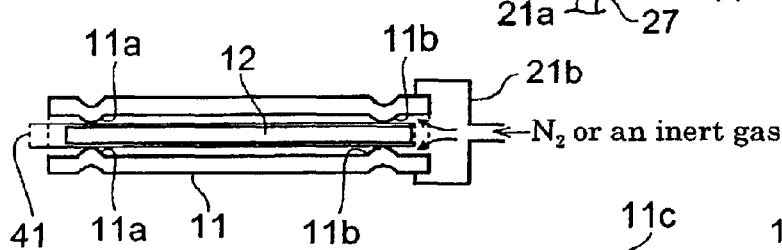
Figure 4D:
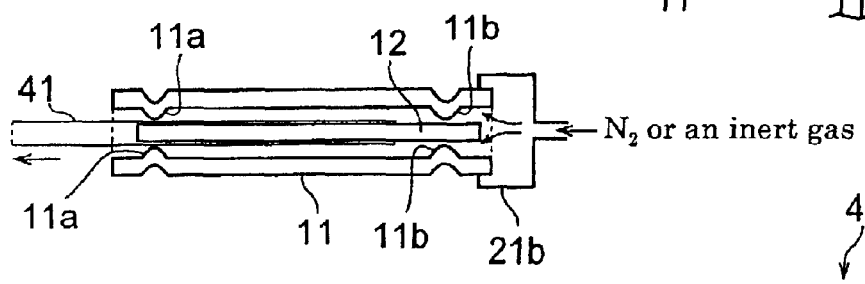
Figure 4E:
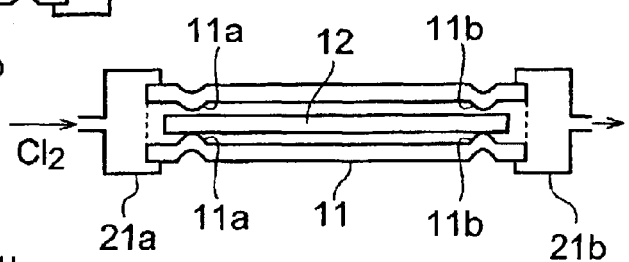
Figure 4F:
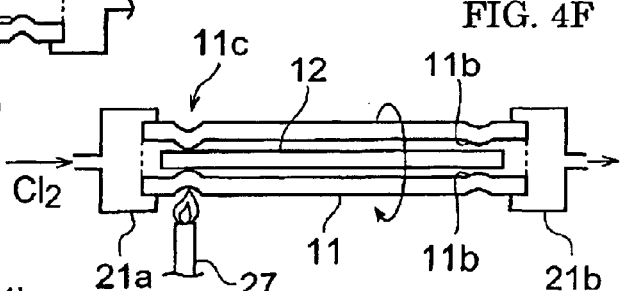
Figure 4G:
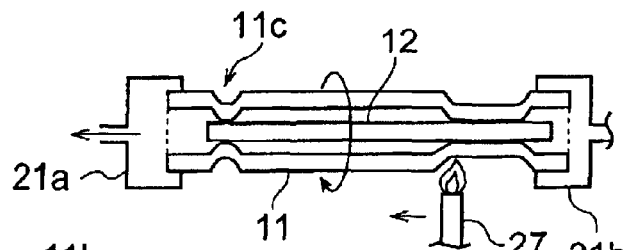
Figure 4H:
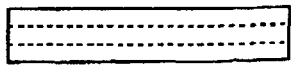

As shown in FIG. 4C, the protective pipe 41 and the rod 12 inserted into the protective pipe 41 are inserted into the pipe 11 provided with diameter-reduced portions 11a and 11b. During this inserting operation, $N_2$ or an inert gas is fed into the pipe 11 from the rotating joint 21b to prevent air from flowing into the pipe 11. As shown in FIG. 4D, while the $N_2$ or inert gas is maintained flowing, the protective pipe 41 is withdrawn such that the rod 12 is left in the pipe 11. After this operation, the rod 12 is supported in the pipe 11 by the diameter-reduced portions 11a and 11b of the pipe 11 as shown in FIG. 4E. As with the first embodiment, a fixing diameter-reduced portion 11c is provided as shown in FIG. 4F, and the pipe 11 and the rod 12 are unified as shown in FIG. 4G. Thus, an optical fiber preform 40 is obtained by the production method of the second embodiment as shown in FIG. 4H.

It is desirable that the protective pipe 41 be made of a material having a hardness lower than that of quartz. More specifically, it is desirable that the protective pipe 41 be made of polytetrafluoroethylene (hereinafter referred to as Teflon (brand name of E. I. du Pont de Nemours and Co.)).

As with the production method of the first embodiment, the second embodiment can produce an optical fiber preform having low core noncircularity and eccentricity. In addition, the use of the protective pipe 41 can prevent the rod 12 and the pipe 11 from being scratched during the insertion of the rod 12. When the surface of the rod 12 or the inner surface of the pipe 11 is scratched, the scratches themselves or glass particles produced by the scratching may produce gas bubbles between the rod 12 and the pipe 11 during the heat unification. If gas bubbles are present in an optical fiber preform, the gas bubbles are transferred to the optical fiber produced from the optical fiber preform and polarization mode dispersion. Gas bubbles in an optical fiber create a problem of an increase in optical transmission loss. The gas bubbles also decrease the strength of the optical fiber. The use of the protective pipe 41 made of a material having a hardness lower than that of quartz, such as Teflon, can prevent the scratching, suppressing the formation of gas bubbles resulting from the scratches.

(Third Embodiment)

The third embodiment of the method for producing the optical fiber preform of the present invention is explained below. FIGS. 5A to 5E are longitudinal sectional views showing the steps of the production method of the third embodiment and the optical fiber preform at the end of each step or at the time of processing.

The steps of the production method of the third embodiment are much the same as those of the first embodiment except that two diameter-reduced portions are formed in the vicinity of one end of the pipe 11. The different aspects are mainly explained below.

Figure 5A:
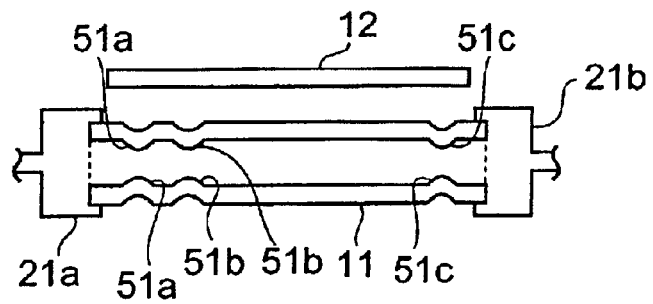
FIGS. 5A to 5E are longitudinal sectional views showing the steps of the production method of the third embodiment and the optical fiber preform at the end of each step or at the time of processing.
Figure 5B:
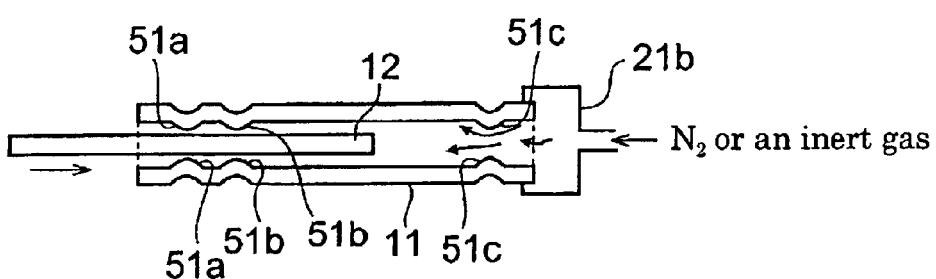

As shown in FIG. 5A, two diameter-reduced portions 51a and 51b are formed in the vicinity of one end of the glass pipe 11, and one diameter-reduced portion 51c is formed in the vicinity of the other end. As shown in FIG. 5B, a glass rod 12 is inserted into the pipe 11. As with the second embodiment, the protective pipe 41 shown in FIG. 4B into which the rod 12 is inserted may be inserted into the pipe 11 so that the protective pipe 41 can be withdrawn leaving the rod 12 in the pipe 11.

Figure 5C:
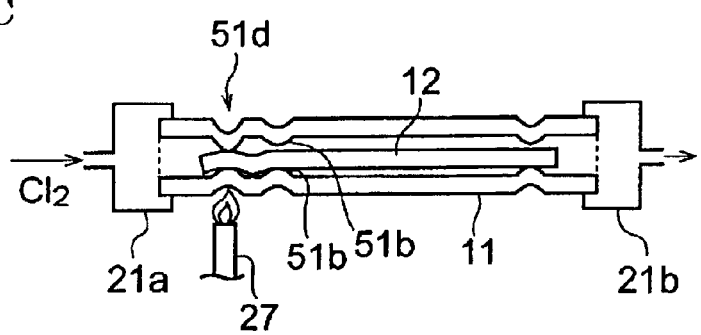
Figure 5D:
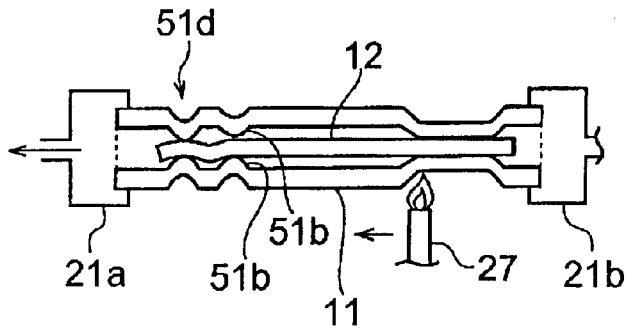
Figure 5E:
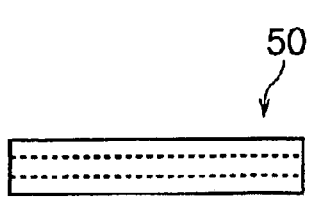

As shown in FIG. 5C, the rod 12 is fixed to the pipe 11 at the diameter-reduced portion 51a, which is nearer to the end of the pipe 11 than the diameter-reduced portion 51b. In other words, the diameter-reduced portion 51a is used for forming a fixing diameter-reduced portion 51d. It is desirable that an unfused portion be provided at the fixing diameter-reduced portion 51d such that the gas in the clearance between the rod 12 and the pipe 11 can pass through the unfused portion at a flow rate V expressed by Eq. (1). As shown in FIG. 5D, the heat source 27 is moved from the diameter-reduced portion 51c forward to the diameter-reduced portion 51b to heat-unify the rod 12 and the pipe 11. Thus, an optical fiber preform 50 is obtained by the production method of the third embodiment as shown in FIG. 5E.

As explained above, in the third embodiment of the method for producing the optical fiber preform, the rod 12 is supported by the diameter-reduced portions 51a, 51b, and 51c such that its center axis is aligned with that of the pipe 11. Furthermore, the rod 12 is fixed to the pipe 11 at the fixing diameter-reduced portion 51d. As a result, an optical fiber preform having low core noncircularity and eccentricity can be obtained.

The third embodiment of the method for producing the optical fiber preform is particularly effective when the rod 12 has a low softening point or a relatively small diameter. If such a glass rod is used, when the rod 12 is fusion-fixed to the pipe 11, the rod 12 may bend. Furthermore, if the heat source 27 happens to have a higher temperature than specified at the time the rod 12 is fusion-fixed to the pipe 11, the rod 12 may bend. The bending of the rod 12 causes decentering of the rod 12, increasing the eccentricity. On the other hand, according to the third embodiment, the rod 12 is also supported by the diameter-reduced portion 51b, which is adjacent to the fixing diameter-reduced portion 51d. Therefore, even when the rod 12 bends at the fixing diameter-reduced portion 51d, the rod 12 can maintain concentricity in the region where the rod 12 is heat-unified with the pipe 11, that is, the region between the diameter-reduced portions 51b and 51c. As a result, the core noncircularity and eccentricity of the optical fiber preform 50 can be reliably reduced.

(Fourth Embodiment)

The fourth embodiment of the method for producing the optical fiber preform of the present invention is explained below. FIGS. 6A to 6F are longitudinal sectional views showing the steps of the production method of the fourth embodiment and the optical fiber preform at the end of each step or at the time of processing. The fourth embodiment is much the same as the first embodiment except that an auxiliary glass rod is connected to the glass rod.

Figure 6A:
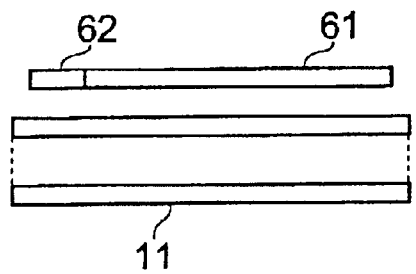
FIGS. 6A to 6F are longitudinal sectional views showing the steps of the production method of the fourth embodiment and the optical fiber preform at the end of each step or at the time of processing.

First, a glass rod 61 made of silica glass doped with germanium oxide ($GeO_2$) and a glass pipe 11 made of silica glass doped with Cl are prepared for producing an optical fiber preform. As shown in FIG. 6A, an auxiliary glass rod 62 made of highly pure silica glass or silica glass doped with fluorine, $P_2O_5$ or Cl is connected to at least one end of the glass rod 61. The auxiliary rod 62 has a diameter nearly equal to that of the glass rod 61 and is connected to the glass rod 61 such that its axis is aligned with that of the glass rod 61.

Figure 6B:
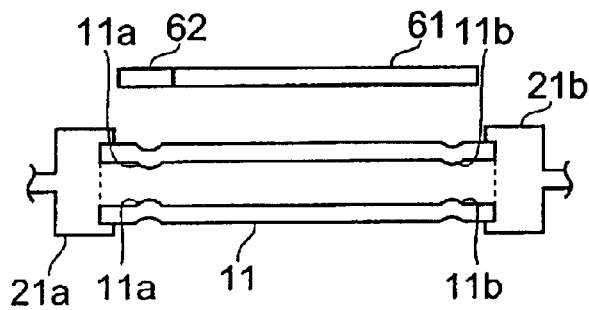
Figure 6C:
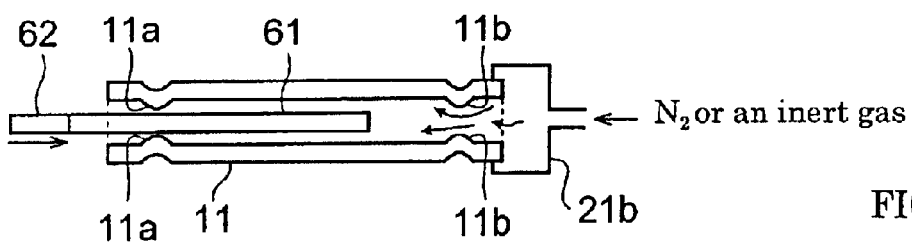
Figure 6D:
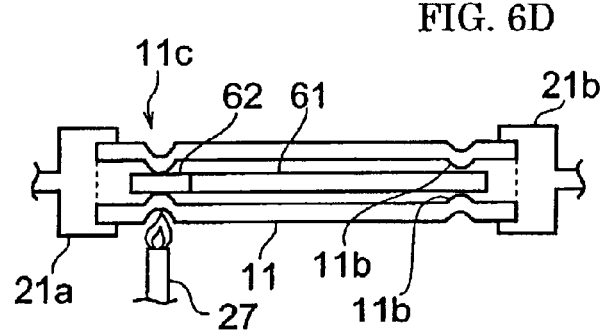
Figure 6E:
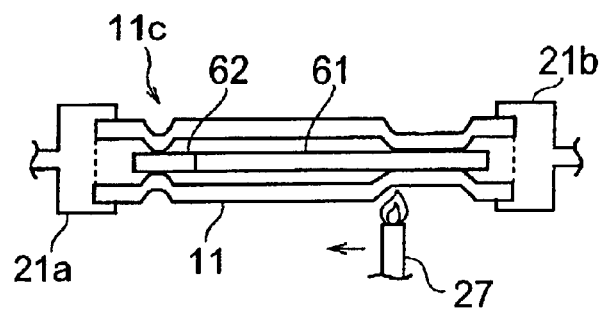
Figure 6F:
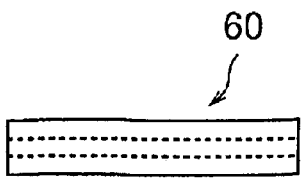

As shown in FIG. 6B, a diameter-reduced portion 11a is formed in the vicinity of one end of the pipe 11 and a diameter-reduced portion 11b is formed in the vicinity of the other end. As with the third embodiment of the production method, two diameter-reduced portions may be formed at one end of the pipe 11. As shown in FIG. 6C, the glass rod 61, to which the auxiliary rod 62 is connected, is inserted into the pipe 11. In this case, as with the second embodiment, the protective pipe 41 shown in FIG. 4B may be used. As shown in FIG. 6D, the auxiliary rod 62 is connected to the pipe 11 at the diameter-reduced portion 11a. In other words, the diameter-reduced portion Ha is used to form a fixing diameter-reduced portion 11c. As shown in FIG. 6E, the pipe 11 and the glass rod 61 are heat-unified by a method similar to that used in the first embodiment. Thus, an optical fiber preform 60 is obtained as shown in FIG. 6F.

As explained above, in the fourth embodiment of the method for producing the optical fiber preform, the pipe 11, made of Cl-doped silica glass, and the auxiliary rod 62, made of highly pure silica glass or silica glass doped with fluorine, $P_2O_5$ or Cl, are fixed mutually at the fixing diameter-reduced portion 11c. In this arrangement, the glass rod 61 is supported such that its center axis is aligned with that of the pipe 11. Therefore, the same effects as in the first embodiment of the method for producing the optical fiber preform can be attained.

Furthermore, the fourth embodiment of the method for producing the optical fiber preform has the effect described below. If the pipe 11, made of Cl-doped silica glass, and the glass rod 61, made of $GeO_2$-doped silica glass, are fusion-fixed mutually, a multitude of microcracks easily develop at the fixed portion. The microcracks are caused by local stresses generated in the $GeO_2$-doped silica glass. More specifically, when the rod 61 is heated and then cooled, stresses due to the heat expansion and contraction are added to the originally existing stresses and cause the microcracks. The development of the microcracks may cause the rod 61 to detach from the pipe 11 while the two members are heat-unified. The detachment causes the decentering of the rod 61 with the pipe 11.

On the other hand, according to the fourth embodiment of the production method, the auxiliary rod 62, made of highly pure silica glass or silica glass doped with fluorine, $P_2O_5$ or Cl and connected to the rod 61, and the pipe 11, made of Cl-doped silica glass, are fixed mutually at the diameter-reduced portion 11a of the pipe 11. The combination of highly pure silica glass or silica glass doped with fluorine, $P_2O_5$ or Cl and Cl-doped silica glass causes no microcracks. Therefore, the two members are reliably fixed, and the detaching of the auxiliary rod 62 from the pipe 11 during the heat unification can be definitely prevented. Consequently, an increase in the core noncircularity and eccentricity due to the longitudinal movement of the rod 61 can be reliably suppressed.

Figure 7:
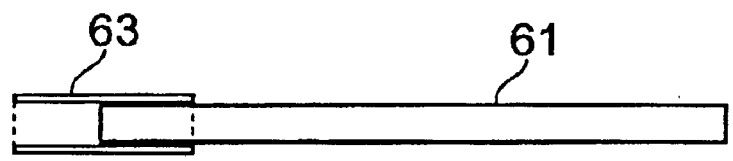
FIG. 7 is a diagram showing an effective glass rod to which an auxiliary glass pipe is connected.

In the above explanation, the auxiliary rod 62 is connected to the rod 61. On the other hand, as shown in FIG. 7, an auxiliary glass pipe 63 may be used to slide it onto the rod 61. It is desirable that the auxiliary rod 62 and the auxiliary pipe 63 be made of highly pure silica glass or silica glass doped with fluorine, $P_2O_5$, or Cl. The silica glass doped with fluorine, $P_2O_5$, or Cl causes no local stresses due to these dopants. Therefore, the auxiliary pipe 63 made of silica glass doped with those dopants develops no microcracks. It is desirable that the auxiliary pipe 63 has an inner diameter slightly larger than the diameter of the rod 61. When this condition is fulfilled, the mere insertion of the rod 61 into the auxiliary pipe 63 can fix the two members mutually. The fixing method using the auxiliary rod 62 or the auxiliary pipe 63 has the advantage described below.

The softening point of the glass rod 61 is reduced by doping it with $GeO_2$. When the rod 61 contains a relatively high concentration of $GeO_2$, the fusion connection between the above-described auxiliary rod 62 and the rod 61 may bend the rod 61. On the other hand, when the auxiliary pipe 63 is used in place of the auxiliary rod 62, and when the rod 61 is inserted into the auxiliary pipe 63 to be fixed with each other, the rod 61 can be prevented from bending. In other words, the foregoing method, in which an auxiliary glass pipe is connected to a glass rod to become a portion of the optical fiber preform (hereinafter, the glass rod is referred to as an effective glass rod), is particularly suitable when an effective glass rod containing a relatively high concentration of $GeO_2$ is used. The foregoing method is also suitable when a glass rod having a relatively small diameter and therefore being liable to bend is used.

When the auxiliary pipe 63 is used, it is desirable that the glass rod 61 has in the vicinity of one of its ends a tapered portion in which the diameter gradually decreases from a specified position to the end. This tapered portion enables the reliable connection between the rod 61 and the auxiliary pipe 63. This tapered portion also enables the insertion of the rod 61 into the auxiliary pipe 63 having an outer diameter nearly equal to the diameter of the rod 61. As a result, the rod 61 to which the auxiliary pipe 63 is connected is readily inserted into the glass pipe.

The production method of the optical fiber preform of the present invention is explained in detail below by referring to several examples.

EXAMPLE 1

In Example 1, an optical fiber preform was produced by the following steps:

(A) An auxiliary glass pipe was connected to each end of a glass pipe that was to become the cladding portion of the optical fiber preform.

(B) A diameter-reduced portion was formed at each auxiliary glass pipe.

(C) A glass rod to become the core portion of the optical fiber preform was inserted into the glass pipe.

(D) The glass rod was fixed to the glass pipe at one of the diameter-reduced portions to form a fixing diameter-reduced portion.

(E) A heat source 27 shown in FIG. 1 was moved from the other diameter-reduced portion forward to the foxing diameter-reduced portion to heat-unify the glass pipe and the glass rod.

Example 1 is explained in detail below. First, a glass pipe and a glass rod were prepared. The glass pipe was made of silica glass doped with 1.3 weight % fluorine and had an inner diameter of 11 mm, an outer diameter of 30 mm, and a length of 450 mm. The glass rod was made of silica glass doped with 0.3 mol % Cl and had a diameter of 8 mm and a length of 550 mm. An auxiliary glass pipe was fusion-connected to each end of the glass pipe with the heat source of the heating apparatus 20 shown in FIG. 1. The auxiliary glass pipe was made of highly pure silica glass and had an inner diameter and an outer diameter both nearly equal to those of the glass pipe and a length of 550 mm. The fusion-connection was carried out such that the center axis of the glass pipe was aligned with the axes of the auxiliary glass pipes.

Next, while the glass pipe to which the auxiliary glass pipes were connected were rotated, and while $SF_6$ was fed into the glass pipe, the glass pipe was heated at about 1,500° C. with the heat source 27 to etch the inner surface. After the etching, a ceramic dummy rod having a diameter of 8.5 mm was inserted into each auxiliary glass pipe. While the glass pipe to which the auxiliary glass pipes were connected was rotated, part of each auxiliary glass pipe was heated uniformly along the circumference with the heat source 27. When the entire inner circumference of the diameter-reduced portion came into contact with the circumference of the ceramic dummy rod, the heating was completed. Then, the dummy rods were removed. Thus, a diameter-reduced portion having an inner diameter of 8.5 mm was formed at each auxiliary glass pipe.

Next, the foregoing glass rod was inserted into the glass pipe provided with the diameter-reduced portions. During this insertion, $N_2$ was fed into the glass pipe from the end opposite to the end from which the glass rod was inserted to prevent air from flowing into the glass pipe. The inserted rod was supported by the diameter-reduced portions of the auxiliary glass pipes. Subsequently, $Cl_2$ was fed into the glass pipe. After the $N_2$ was replaced with the $Cl_2$, the glass pipe and the glass rod were rotated. While the rotation was maintained, one of the diameter-reduced portions was heated from outside with the heat source 27 to fix the glass rod to the diameter-reduced portion. Thus, a fixing diameter-reduced portion was formed. The fixing diameter-reduced portion was provided with an unfused portion through which $Cl_2$ could pass at a flow rate of V satisfying Eq. (1). While $Cl_2$ was fed into the glass pipe at a specified flow rate, the glass pipe was heated to perform the baking. After the baking, the flow rate of the $Cl_2$ flowing in the glass pipe was adjusted to about $3.0 \times 10^5$ mm$^3$/min under standard temperature and pressure (STP). While the feeding of the $Cl_2$ and the rotation of the glass pipe and the glass rod were maintained, the diameter-reduced portion opposite to the fixing diameter-reduced portion was heated. Immediately after the auxiliary glass pipe and the glass rod were heat-unified over the entire circumference, the pressure inside the glass pipe was reduced with an evacuating apparatus to a vacuum degree of −2 kPa in the reading on a pressure gauge that was designed to measure a pressure difference from atmospheric pressure. While the vacuum degree was maintained, the heat source 27 was moved to the fixing diameter-reduced portion at a speed of 30 mm/min to unify the glass rod and the glass pipe. The surface temperature of the glass pipe heated with the heat source 27 was about 1,620° C. Thus, an optical fiber preform 1A of Example 1 was obtained.

To compare with Example 1, Comparative example 1S produced an optical fiber preform 1S by the following process. After the above-described steps (A), (B), and (C) were conducted, a glass rod and a glass pipe were heat-unified, without conducting the step (D). Comparative example 1T produced an optical fiber preform 1T by the following process. After the steps (A) and (C) were conducted, a glass rod and a glass pipe were heat-unified. The glass rod, glass pipe, and auxiliary glass pipe used for the production and the producing conditions such as the heating condition were the same as those in Example 1.

Figure 8:
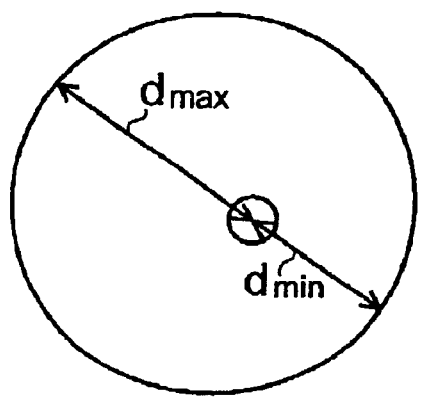
FIG. 8 is a diagram explaining the definition of the term "eccentricity."

The core noncircularity and eccentricity of the optical fiber preforms 1A, 1S, and 1T were measured with a preform analyzer at a plurality of longitudinal locations. The term "core noncircularity" is defined by $(2a_{max} - 2a_{min})/2a_{max}$, where $2a_{max}$ is the length of the major axis of the approximate ellipse of the cross section of the core portion and $2a_{min}$ is the length of the minor axis (the cross section is perpendicular to the center axis of the optical fiber preform). The term "eccentricity" is defined by $(d_{max} - d_{min})/(d_{max} + d_{min})$, where $d_{max}$ is the maximum distance between the center of the core portion and the circumference of the cladding portion in the cross section of the optical fiber preform as shown in FIG. 8, and $d_{min}$ is the minimum distance. The measured results are shown in Table I.

TABLE I

| Optical fiber preform | 1A | 1S | 1T |
| --- | --- | --- | --- |
| Core noncircularity (%) | 0.1–0.4 | 1.5–2.5 | 1.8–4.2 |
| Eccentricity (%) | 0.1–0.5 | 3–10 | 17–20 |

Table I shows that the optical fiber preform 1A is superior to the optical fiber preforms 1S and 1T in the core noncircularity and eccentricity.

EXAMPLE 2, 2S, AND 2T

Example 2 corresponds to the above-described second embodiment. This example is explained in detail below. First, a glass pipe and a glass rod were prepared. The glass pipe was made of silica glass doped with 1.3 weight % fluorine and had an inner diameter of 9 mm, an outer diameter of 30 mm, and a length of 400 mm. The glass rod was made of silica glass doped with 0.3 mol % Cl and had a diameter of 8 mm and a length of 450 mm. The glass pipe was attached to the heating apparatus. The glass pipe was then rotated, and $SF_6$ was fed into the glass pipe. With this condition maintained, the glass pipe was heated at about 1,500° C. with the heat source 27 shown in FIG. 1 to etch the inner surface. A diameter-reduced portion having an inner diameter of 8.5 mm was formed in the vicinity of each end of the glass pipe by a procedure similar to that in Example 1.

Next, the glass rod was inserted into a protective pipe made of Teflon. The protective pipe had an inner diameter of 8.1 mm and an outer diameter of 8.4 mm. The protective pipe into which the glass rod was inserted was inserted into the glass pipe provided with diameter-reduced portions. After the insertion, only the protective pipe was withdrawn. After the withdrawal, the glass rod was supported in the glass pipe by the diameter-reduced portions. Subsequently, $Cl_2$ was fed into the glass pipe, and the glass pipe and the glass rod were rotated. With this condition maintained, one of the diameter-reduced portions was heated from outside with the heat source 27 to fix the glass rod to the diameter-reduced portion. Thus, a fixing diameter-reduced portion was formed. The fixing diameter-reduced portion was provided with an unfused portion through which $Cl_2$ could pass at a flow rate of V satisfying Eq. (1). While $Cl_2$ was fed into the glass pipe, the glass pipe was heated from outside with the heat source 27 to clean the inside by baking. After the baking, the flow rate of the $Cl_2$ was adjusted to $3.0 \times 10^5$ mm$^3$/min under STP, and the number of revolutions of the glass pipe and rod was adjusted to a specified value. Then, the diameter-reduced portion opposite to the fixing diameter-reduced portion was heated with the heat source 27 to unify the glass pipe and the glass rod. Immediately after the unification, the pressure inside the glass pipe was reduced and adjusted with an evacuating apparatus to −7 kPa in the reading on the pressure gauge. The heat source 27 was moved to the fixing diameter-reduced portion at a speed of 30 mm/min to unify the glass rod and the glass pipe. The surface temperature of the glass pipe heated with the heat source 27 was about 1,550° C.

Thus, an optical fiber preform intermediate 2A was obtained. Measurements by a preform analyzer showed that the optical fiber preform intermediate 2A had an overall diameter of 29 mm and a core-portion diameter of 8 mm. Subsequently, a jacket portion made of silica glass doped with 1.3 weight % fluorine was formed over the circumference of the optical fiber preform intermediate 2A. Thus, an optical fiber preform 20A having a cladding diameter-to-core diameter ratio of 12.7 was obtained. The preform 20A was drawn to obtain an optical fiber having a diameter of 125 μm.

To compare with Example 2, Example 2S produced an optical fiber preform intermediate 2S and an optical fiber by using a protective pipe made of silica glass in place of Teflon. Example 2T produced an optical fiber preform intermediate 2T and an optical fiber without using a protective pipe. The protective pipe used in Example 2S had an inner diameter of 8.1 mm and an outer diameter of 8.4 mm. The steps other than the glass-rod-inserting step were the same as in Example 2.

The number of gas bubbles existing in the optical fiber preform intermediates 2A, 2S, and 2T produced in Examples 2, 2S, and 2T was measured on a per-300-mm basis. Transmission loss at a wavelength of 1,550 nm was measured on the optical fibers produced by drawing the optical fiber preforms 20A, 20S, and 20T. The measured results are shown in Table II.

TABLE II

| Example | 2 | 2S | 2T |
| --- | --- | --- | --- |
| Number of gas bubbles | 0 | 2 | 6 |
| Transmission loss (dB/km) | 0.165 | 0.165 | 0.175 |

As can be seen from Table II, a sufficiently low transmission loss for practical use can be obtained even without using the protective pipe. However, the transmission loss can be further reduced by using the protective pipe. Moreover, Example 2 can further decrease the development of gas bubbles, thereby preventing a reduction in mechanical strength of the optical fibers thus produced.

EXAMPLE 3

Example 3 corresponds to the first embodiment. For comparison, optical fiber preforms 3S, 3T, and 3U were produced under the conditions that did not satisfy Eq. (1).

Example 3 produced an optical fiber preform by the following steps. First, a glass pipe and a glass rod were prepared. The glass pipe was made of silica glass doped with 1.3 weight % fluorine and had an inner diameter of 6 mm, an outer diameter of 35 mm, and a length of 300 mm. The glass rod was made of highly pure silica glass and had a diameter of 4 mm and a length of 350 mm.

A diameter-reduced portion having an inner diameter of 4.3 mm was formed in the vicinity of each end of the glass pipe by the same procedure as in Example 1. After the formation of the diameter-reduced portions, the glass rod was inserted into the glass pipe. One of the diameter-reduced portions was heated to fix the glass rod to the glass pipe. Thus, a fixing diameter-reduced portion was formed. The fixing diameter-reduced portion was provided with an unfused portion through which a gas existing in the clearance between the glass pipe and the glass rod could pass at a flow rate of about 480 mm³/min under the heat-unifying condition described below.

Subsequently, the heat source was moved at a speed of 30 mm/min to heat-unify the glass pipe and the glass rod. Thus, an optical fiber preform 3A was produced. In this process, the flow rate of the $Cl_2$ fed into the glass pipe was adjusted to $2.0 \times 10^5$ mm³/min under STP. During the heat unification, the pressure inside the glass pipe was adjusted to −4 kPa in the reading on the pressure gauge 26. The temperature of the glass pipe during the heat unification was 1,550° C. An appearance inspection of the produced optical fiber preform 3A showed no abnormalities, demonstrating the production of a good preform.

For comparison, optical fiber preforms 3S, 3T, and 3U were produced by providing an unfused portion having a predetermined size at the fixing diameter-reduced portion when the glass rod was fixed to the glass pipe. The sizes of the unfused portion of Examples 3S, 3T, and 3U were such that a gas existing in the clearance between the glass pipe and the glass rod could pass through the unfused portion at a flow rate of about 405 mm³/min, about 197 mm³/min, and about 109 mm³/min, respectively, when the glass pipe and the glass rod were heat-unified under the same condition as in Example 3. With the preform 3S, part of the glass pipe inflated during the heat unification, and the produced preform included relatively large gas bubbles. With the preforms 3T and 3U, the glass pipe inflated during the heat unification. This inflation forced to stop the heat unification, and the production of the preform had to be discontinued.

As described above, the optical fiber preforms 3A, 3S, 3T, and 3U were produced by using the glass pipe having an inner diameter of 6 mm at the portion other than the diameter-reduced portions and the glass rod having a diameter of 4 mm. A calculation of the right-hand side of Eq. (1) by using these figures gives a flow rate of 471 mm³/min. In other words, of the optical fiber preforms 3A, 3S, 3T, and 3U, only the preform 3A produced as Example 3 was designed to satisfy Eq. (1). The results obtained by producing the preforms 3A, 3S, 3T, and 3U demonstrate that a production method that satisfies the condition expressed by Eq. (1) can produce a good optical fiber preform.

EXAMPLE 4

Example 4 produced an optical fiber preform by the same procedure as in Example 1 except that two diameter-reduced portions were formed at one of the two auxiliary glass pipes connected to the glass pipe to become the cladding portion of the optical fiber preform (one auxiliary glass pipe was connected to each end of the glass pipe). Hereinafter, the glass pipe is referred to as an effective glass pipe. Example 4 is explained below by focusing attention on the different aspects.

First, an effective glass pipe, a glass rod, and two auxiliary glass pipes were prepared. The effective glass pipe was made of silica glass doped with 0.2 mol % Cl and had an outer diameter of 25 mm. The glass rod was made of silica glass doped with 1.5 weight % fluorine and had a diameter of 3 mm. The auxiliary glass pipe was made of highly pure silica glass and had an outer diameter and an inner diameter both nearly equal to those of the effective glass pipe. One of the auxiliary glass pipes was fusion-connected to each end of the effective glass pipe. The fusion-connection was carried out such that the center axis of the effective glass pipe was aligned with the axes of the auxiliary glass pipes.

Next, the effective glass pipe to which the auxiliary glass pipes were connected was attached to the heating apparatus 20 shown in FIG. 1. These pipes were rotated, and $SF_6$ was fed into the glass pipes. Then, these pipes were heated at about 1,500° C. with the heat source 27 to etch the inner surface. After the etching, the inner diameter of the effective glass pipe was 6 mm. Subsequently, two diameter-reduced portions were formed at one of the two auxiliary glass pipes, and one diameter-reduced portion was formed at the other auxiliary glass pipe. All of the diameter-reduced portions had an inner diameter of about 3.5 mm. After the formation of the diameter-reduced portions, the glass rod was inserted into the effective glass pipe.

While $Cl_2$ was fed into the effective glass pipe, the glass rod was fusion-fixed to the auxiliary glass pipe provided with two diameter-reduced portions. The diameter-reduced portion to which the glass rod was fixed was the one nearer to the free end of the auxiliary glass pipe. Thus, the fixing diameter-reduced portion was formed at the auxiliary glass pipe. The surface temperature of the auxiliary glass pipe during the fixing was 1,550° C. An observation revealed that the glass rod bent at the fixing diameter-reduced portion. The present inventors believe that the bending was caused by the fact that (1) the glass rod had a relatively small diameter of 3 mm as described above and (2) being doped with fluorine, the glass rod had a softening point lower than that of the auxiliary glass pipe. The observation also revealed that the bent portion was limited to the section between the fixing diameter-reduced portion and the adjacent diameter-reduced portion. No bending was observed in the section between the adjacent diameter-reduced portion and the other diameter-reduced portion formed at the other auxiliary glass pipe connected to the far end of the effective glass pipe. The axes of the effective glass pipe and the glass rod were nearly in alignment.

Subsequently, an optical fiber preform 4 was obtained by heat-unifying the glass pipe and the glass rod through a procedure similar to that of Example 1. More specifically, the flow rate of the $Cl_2$ was adjusted to $3.0 \times 10^5$ mm$^3$//min under STP, and the pressure inside the glass pipe during the heat unification was adjusted to −1.5 kPa in the reading on the pressure gauge. The obtained optical fiber preform 4 had a diameter of 23.9 mm. The core noncircularity of the preform 4 was measured at a plurality of longitudinal locations. The result demonstrated that preform 4 had a core noncircularity as good as 0.1% to 0.2%.

For comparison, an optical fiber preform 4S was produced by providing one diameter-reduced portion at each auxiliary glass pipe. The other procedure and conditions were the same as in Example 4. The obtained preform 4S had a core noncircularity as high as 1.5% to 2.2%. The result clearly demonstrates the effect of the structure employed in Example 4.

EXAMPLES 5A to 5C

In Examples 5A to 5C, the following components were used. A glass pipe (hereinafter referred to as an effective glass pipe) made of silica glass doped with 0.2 mol % Cl and having an inner diameter of 6 mm and an outer diameter of 25 mm was prepared. A glass rod (hereinafter referred to as an effective glass rod) made of silica glass doped with 10 mol % $GeO_2$ and having a diameter of 3 mm was prepared.

The following optical fiber preforms were produced by changing the combination of the glass pipe and the glass rod. The combination was conducted by selecting (1) the presence or absence of the connection of auxiliary glass pipes to the ends of the effective glass pipe and (2) the presence or absence of the connection of auxiliary glass rods to the ends of the effective glass rod.

(a) Example 5A: An auxiliary glass pipe made of highly pure silica glass was connected to each end of the effective glass pipe. An auxiliary glass rod made of highly pure silica glass was connected to one end of the effective glass rod.

(b) Example 5B: An auxiliary glass pipe made of highly pure silica glass was connected to each end of the effective glass pipe. An auxiliary glass rod made of silica glass doped with 1 weight % fluorine was connected to one end of the effective glass rod.

(c) Example 5C: No auxiliary glass pipe was connected to the effective glass pipe. An auxiliary glass rod made of highly pure silica glass was connected to one end of the effective glass rod.

In Examples 5A to 5C, after auxiliary glass pipes were connected to the effective glass pipe, diameter-reduced portions were formed at the auxiliary glass pipes. As with Example 4, two diameter-reduced portions were formed at one of the two auxiliary glass pipes or in the vicinity of one end of the effective glass pipe when no auxiliary glass pipes were used. Of the two diameter-reduced portions, the one nearer to the free end of the glass pipe was used to fusion-fix the glass rod and the glass pipe. While the fixing was carried out, the surface temperature of the auxiliary glass pipe or effective glass pipe was adjusted to 1,400° C. for Example 5A and 1,350° C. for Examples 5B and 5C. The procedure and conditions for the heat unification were the same as in Example 1. Examples 5A, 5B, and 5C produced the optical fiber preforms 5A, 5B, and 5C, respectively.

Measurements of the core noncircularity on the obtained optical fiber preforms revealed that the preform 5A had a value of 0.2% to 0.6%, and the preforms 5B and 5C had a value of 0.1% to 0.3%. The result demonstrated that all of Examples 5A, 5B, and 5C produced optical fiber preforms having a good core noncircularity. In particular, the preforms 5B and 5C had a lower core noncircularity than the preform 5A. The present inventors believe that the difference was caused by the difference in the melting point of the silica glass between the fixing diameter-reduced portions. As described above, the preform 5A had the fixing diameter-reduced portion composed of the auxiliary glass pipe and the auxiliary glass rod both made of highly pure silica glass. On the other hand, the preform 5B had the fixing diameter-reduced portion composed of the auxiliary glass pipe made of highly pure silica glass and the auxiliary glass rod made of fluorine-doped silica glass. The preform 5C had the fixing diameter-reduced portion composed of the effective glass pipe made of Cl-doped silica glass and the auxiliary glass rod made of highly pure silica glass. Therefore, the preforms 5B and 5C were able to be provided with the fixing diameter-reduced portion at which the glass rod was fusion-fixed to the glass pipe at a lower heating temperature than the preform 5A. When the fusion temperature is reduced, the possibility of the deformation of the glass rod can be reduced. As a result, the core noncircularity of the optical fiber preform can be reduced.

To compare with Examples 5A to 5C, an optical fiber preform 5S was produced with the following components and method. A glass pipe that was composed of the foregoing effective glass pipe and an auxiliary glass pipe made of highly pure silica glass and connected to each end of the effective glass pipe was used. The same effective glass rod as in Examples 5A to 5C was used without connecting to auxiliary glass pipes. The procedure and conditions for the production were much the same as in Example 5A. The production, however, encountered a trouble. The effective glass rod detached from the fixing diameter-reduced portion during the heat unification. Three samples having the same structure were produced. In all the samples, the effective glass rod detached from the fixing diameter-reduced portion. Notwithstanding the detaching, the heat unification was continued to complete the production of the optical fiber preform 5S. Measured results of the core noncircularity of the preform 5S showed values as high as 2.0% to 3.2%.

While the heat unification is performed, the fusion of the glass rod and the glass pipe at the heating portion generates a force that pulls the glass rod toward the fusing portion. When the glass rod detaches from the fixing diameter-reduced portion, the glass rod moves toward the fusing portion. This movement causes the decentering of the glass rod, thereby increasing the core noncircularity.

EXAMPLE 6

In Example 6, the following components were used. Two glass pipes (hereinafter referred to as effective glass pipes) made of silica glass doped with 0.2 mol % Cl and having an inner diameter of 7 mm and an outer diameter of 30 mm were prepared. Two glass rods (hereinafter referred to as effective glass rods) made of silica glass doped with 10 mol % $GeO_2$ and having a diameter of 4 mm was prepared. An auxiliary glass pipe made of highly pure silica glass and having an inner diameter and an outer diameter both nearly equal to those of the effective glass pipe was connected to each end of each of the two effective glass pipes. Two diameter-reduced portions were formed at one of the two auxiliary glass pipes connected to each effective pipe, and one diameter-reduced portion was formed at the other auxiliary glass pipe. The inner diameter of the diameter-reduced portions was 4.5 mm for one of the two glass pipes and 5.0 mm for the other glass pipe.

Subsequently, optical fiber preforms were produced by a procedure similar to that of Example 4. The heat unification was carried out under the following conditions. The flow rate of $Cl_2$ was adjusted to $3.0 \times 10^5$ mm$^3$/min, and that of $O_2$ to $3.0 \times 10^5$ mm$^3$//min under STP. The heat source 27 shown in FIG. 1 was moved at a speed of 30 mm/min. The temperature of the glass pipe during the heat unification was adjusted to 1,570° C. For the purpose of explanation, the optical fiber preform produced by using the glass pipe provided with the diameter-reduced portions having an inner diameter of 4.5 mm is referred to as an optical fiber preform 6A. The optical fiber preform produced by using the glass pipe provided with the diameter-reduced portions having an inner diameter of 5.0 mm is referred to as an optical fiber preform 6B.

For comparison, optical fiber preforms 6S and 6T were produced by the following procedure. Two sets of much the same glass pipes, glass rods, and auxiliary glass pipes as used in the production of the optical fiber preforms 6A and 6B were prepared. An auxiliary glass pipe was connected to each end of each effective glass pipe. Then, diameter-reduced portions were provided at the auxiliary glass pipes by the same procedure as used in the production of the preforms 6A and 6B. The inner diameter of the diameter-reduced portions was 5.5 mm for the preform 6S and 6.0 mm for the preform 6T. The subsequent procedure and conditions were the same as used in the production of the preforms 6A and 6B.

Figure 9:
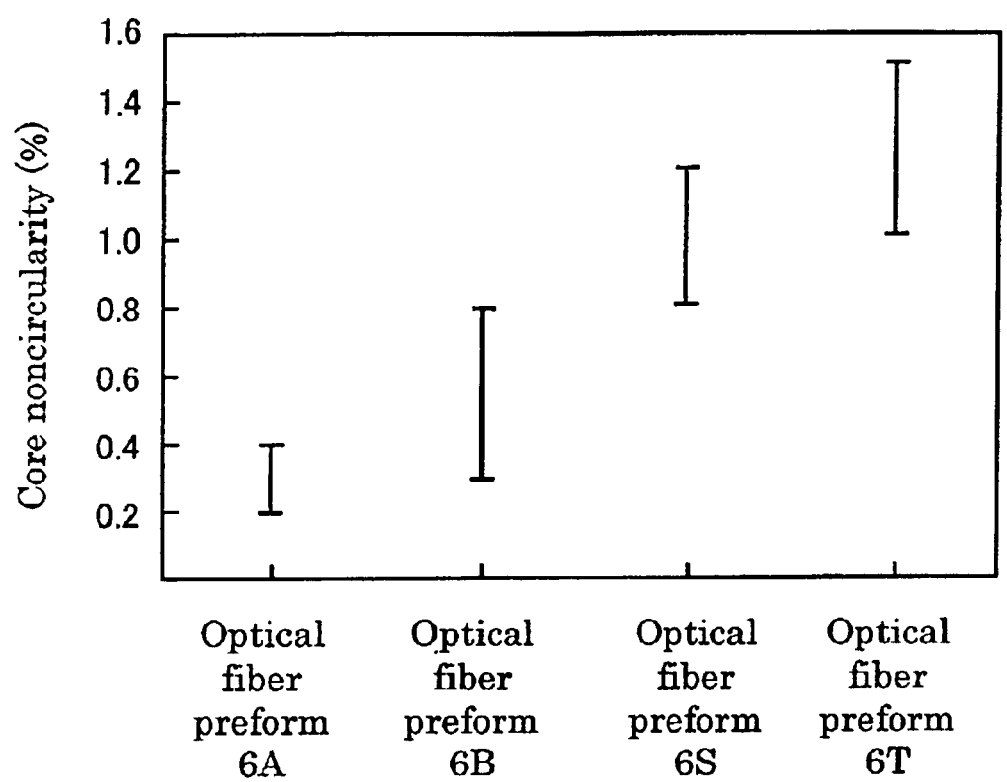
FIG. 9 is a graph showing the core noncircularity measured on optical fiber preforms 6A, 6B, 6S, and 6T.

FIG. 9 is a graph showing the core noncircularity measured on the produced optical fiber preforms 6A, 6B, 6S, and 6T. As can be seen from FIG. 9, the preform 6A has a value of 0.2% to 0.4%, and the preform 6B has a value of 0.3% to 0.8%. Both preforms are satisfactory. On the other hand, the preform 6S, produced with the diameter-reduced portions having an inner diameter of 5.5 mm, has a value of 0.8% to 1.2%. Although the lowest value (0.8%) is relatively good, the core noncircularity is comparatively high as a whole. The preform 6T, produced with the diameter-reduced portions having an inner diameter of 6.0 mm, has a value of 1.0% to 1.5%, which is comparatively high.

The above-described results demonstrate that when the diameter-reduced portions have an inner diameter of 4.5 or 5.0 mm, an excellent core noncircularity can be attained. In other words, it is particularly desirable that the difference between the inner diameter of the diameter-reduced portions and the diameter of the glass rod be not more than 1 mm.

EXAMPLES 7A to 7E

In Examples 7A to 7E, five glass pipes (hereinafter referred to as effective glass pipes) made of silica glass doped with 1.1 weight % fluorine and having an outer diameter of 25 mm were prepared. The five effective glass pipes had a different inner diameter ranging from 6.3 to 11.7 mm as shown in the row entitled "Inner diameter of effective glass pipe" in Table III below. Five glass rods (hereinafter referred to as effective glass rods) made of silica glass doped with 27 mol % $GeO_2$ and having a diameter of 6.1 mm were prepared to be combined with the effective glass pipes.

An auxiliary glass pipe made of highly pure silica glass and having an inner diameter of 8 mm and an outer diameter of 25 mm was connected to each end of each of the five effective glass pipes. The connection was conducted such that the axes of the auxiliary glass pipes and the effective glass pipe were nearly aligned Two diameter-reduced portions were formed at one of the two auxiliary glass pipes, and one diameter-reduced portion was formed at the other auxiliary glass pipe. After the formation of the diameter-reduced portions, the effective glass rod was inserted into the effective glass pipe to which the auxiliary glass pipes were connected. Then, a rotating joint shown in FIG. 1 was connected to each auxiliary glass pipe to attach the effective glass pipe, to which the auxiliary glass pipes were connected, to the heating apparatus shown in FIG. 1. The effective glass rod was fusion-fixed to the auxiliary glass pipe provided with two diameter-reduced portions. The diameter-reduced portion to which the glass rod was fixed was the one nearer to the free end of the auxiliary glass pipe. After the fusion-fixing, the effective glass rod was heat-unified with the glass pipe under the conditions described below. The flow rate of $Cl_2$ was adjusted to $3.0 \times 10^5$ mm$^3$/min, and that of $O_2$ to $3.0 \times 10^5$ mm$^3$//min under STP. The heat source 27 was moved at a speed of 30 mm/min. The pressure inside the glass pipe was −0.5 kPa in the reading on the pressure gauge. The temperature of the glass pipe during the heat unification under the above-described conditions was 1,530° C.

In the explanation below, the five optical fiber preforms produced by using an effective glass pipe having a different inner diameter are referred to as optical fiber preforms 7A to 7E as shown in Table III. Visual appearance inspections and core-noncircularity measurements were conducted on the preforms 7A to 7E. In the appearance inspections, the number of gas bubbles existing in the preforms 7A to 7E was counted. The measured results of the core noncircularity of the preforms 7A to 7E are shown in Table III. The term "Clearance" in Table III denotes the value expressed by $(d_p - d_r)/2$, where $d_p$ is the inner diameter of the glass pipe, and $d_r$ is the diameter of the glass rod.

As can be seen from Table III, the measured results of the core noncircularity are satisfactory, although the preform 7A has a slightly higher value than the others. No gas bubble was observed in the preforms 7A to 7D. In the preform 7E, about one gas bubble per 50 mm in length was observed on average. Considering that the preform 7E has a core noncircularity as excellent as 0.1% to 0.2%, the observed number of gas bubbles causes no practical problem.

TABLE III

| Optical fiber preform | 7A | 7B | 7C | 7D | 7E |
|---|---|---|---|---|---|
| Inner diameter of effective glass pipe (mm) | 11.7 | 10.1 | 8.5 | 7.1 | 6.3 |
| Clearance (mm) | 2.8 | 2.0 | 1.2 | 0.5 | 0.1 |
| Diameter after unification (mm) | 23.6 | 23.7 | 23.7 | 23.8 | 23.9 |
| Core noncircularity (%) | 0.7–0.9 | 0.4–0.8 | 0.1–0.6 | 0.1–0.4 | 0.1–0.2 |

To compare with the optical fiber preforms 7A to 7E, optical fiber preforms 7S, 7T, and 7U were produced as described below. Three effective glass pipes having the same outer diameter and concentration of the doped fluorine as those of the effective glass pipes used in the production of the preforms 7A to 7E were prepared. The inner diameters of the effective glass pipes for the preforms 7S, 7T, and 7U were 13.9, 13.1, and 6.2 mm, respectively, which are different from those of the effective glass pipes used for the preforms 7A to 7E. Three glass rods that were much the same as the effective glass rods used in the production of the preforms 7A to 7E were prepared. The procedure and conditions for the production of the preforms 7S to 7U were much the same as those of the preforms 7A to 7E.

Visual appearance inspections and core-noncircularity measurements were conducted on the preforms 7S to 7U. The measured results of the core noncircularity and other data are shown in Table IV. In the preform 7U, a large number of gas bubbles were observed over the entire preform. Consequently, it was impossible to measure the core noncircularity. In the preform 7S, although no gas bubbles were observed, the core noncircularity was as high as 1.2% to 1.6%, which is not desirable. In the preform 7T, no gas bubbles were observed. Its core noncircularity was comparatively high as a whole, although the lowest value (0.8%) was relatively good.

The above-described results demonstrate that when the clearance $(d_p-d_r)/2$ between the effective glass rod and the effective glass pipe is at least 0.1 mm and at most 3.0 mm, an preform containing no bubbles and an excellent core noncircularity can be attained.

TABLE IV

| Optical fiber preform | 7S | 7T | 7U |
|---|---|---|---|
| Inner diameter of effective glass pipe (mm) | 13.9 | 13.1 | 6.2 |
| Clearance (mm) | 3.9 | 3.2 | 0.05 |
| Diameter after unification (mm) | 23.5 | 23.6 | 23.9 |
| Core noncircularity (%) | 1.2–1.6 | 0.8–1.3 | Immeasurable |

EXAMPLE 8

Figure 10:
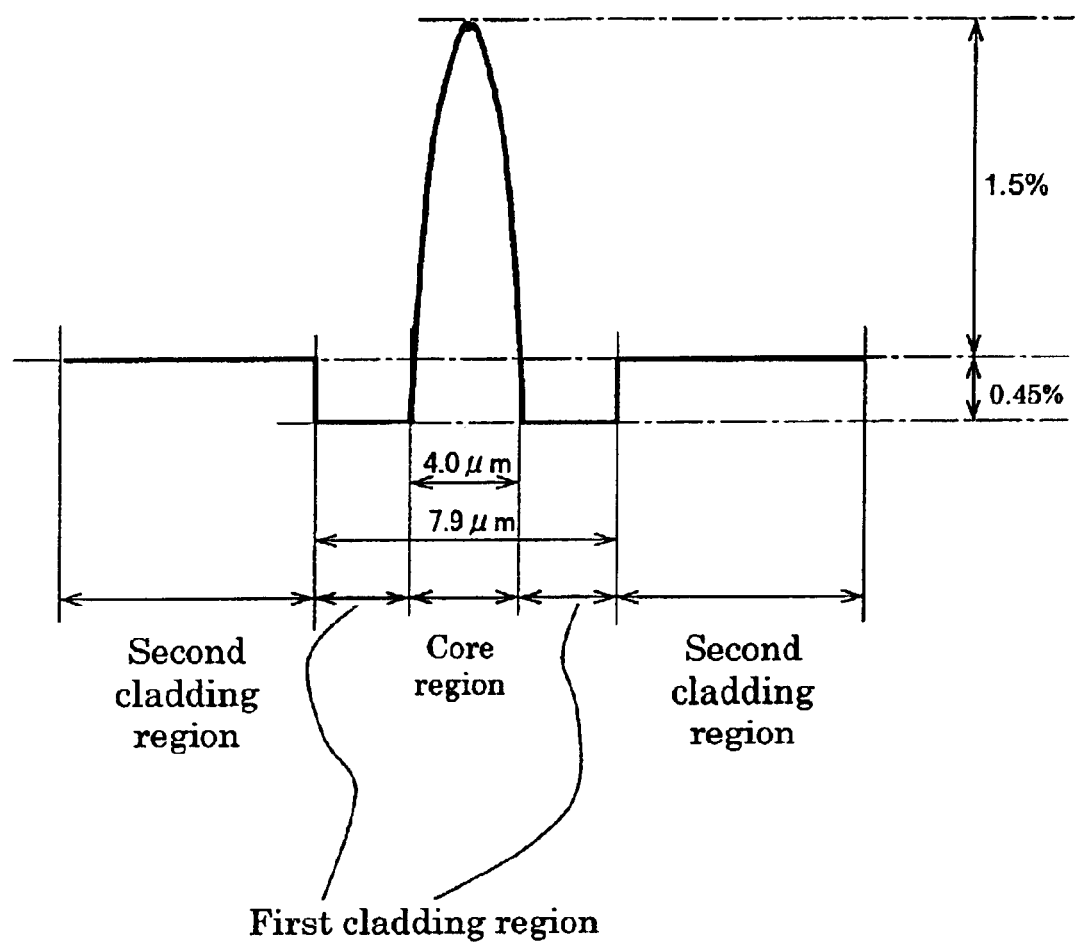
FIG. 10 is a schematic diagram showing a refractive-index profile of a dispersion-compensating fiber.

In Example 8, an optical fiber preform suitable for producing a dispersion-compensating fiber was produced. An optical fiber was also produced by drawing the preform. FIG. 10 is a schematic diagram showing a refractive-index profile of a dispersion-compensating fiber. As shown in FIG. 10, a dispersion-compensating fiber has a depressed-cladding-type refractive-index profile. More specifically, the optical fiber has a core region, a first cladding region, and a second cladding region. In this case, the relative refractive-index difference Δ of the core region to the second cladding region is 1.50%. The relative refractive-index difference Δ of the first cladding region to the second cladding region is 0.45%. The core region has a diameter of 4.0 μm. The first cladding region has an outer diameter of 7.9 μm. The optical fiber preform for producing such an optical fiber has a core portion corresponding to the core region, a first cladding portion corresponding to the first cladding region, and a second cladding portion corresponding to the second cladding region.

First, a glass pipe (hereinafter referred to as an effective glass pipe) made of silica glass containing 1.4 weight % fluorine and having an inner diameter of 6 mm and an outer diameter of 25 mm was prepared. A glass rod (hereinafter referred to as an effective glass rod) made of silica glass containing $GeO_2$ and having a diameter of 6.1 mm was prepared. The effective glass rod forms the core region, and the effective glass pipe forms the first cladding region. The $GeO_2$ concentration n of the effective glass rod had a maximum value, $n_0$, of 15 mol % and a distribution expressed approximately by the equation $n(r)=n_0 \times \{1-(r/a)^{2.0}\}$, where a is the radius of the effective glass rod, and r is the distance from the center axis ($r \geq a$). The effective glass pipe and the effective glass rod were produced by the vapor-phase axial deposition (VAD) method.

A dummy pipe made of highly pure silica glass and having an inner diameter of 6.11 mm and an outer diameter of 6.3 mm was slid onto one end of the effective glass rod. The effective glass rod onto which the dummy pipe was slid was immersed in a hydrofluoric acid to etch them. The etching was performed until the diameter of the effective glass rod became 6.0 mm and that of the dummy pipe became 6.2 mm. The etching removed dust and other undesirable substances from the surface of the effective glass rod.

Subsequently, an auxiliary glass pipe made of highly pure silica glass and having an inner diameter of 6.5 mm and an outer diameter of 25 mm was connected to one end of the effective glass pipe. The effective glass pipe to which the auxiliary glass pipe was connected was attached to a heating apparatus 20 shown in FIG. 1. While $SF_6$ was fed into the glass pipes from the gas-feeding tube 22, the effective glass pipe and the auxiliary glass pipe were heated at about 1,500° C. to etch their inner surfaces. The etching increased the inner diameter of the effective glass pipe to 7.0 mm and smoothed its inner surface. Two diameter-reduced portions having an inner diameter of 6.5 mm were formed at the auxiliary glass pipe. One diameter-reduced portion having an inner diameter of 6.7 mm was formed in the vicinity of the effective glass pipe's end to which no auxiliary glass pipe was connected.

Next, the above-described effective glass rod was inserted into a protective pipe made of Teflon and having an inner diameter of 6.2 mm and an outer diameter of 6.4 mm. The protective pipe into which the effective glass rod was inserted was inserted into the glass pipe provided with the above-described diameter-reduced portions. Then, only the protective pipe was withdrawn from the glass pipe. After the withdrawal, the dummy pipe that was slid onto the effective glass rod was coupled with the diameter-reduced portion nearer to the free end of the auxiliary glass pipe, which had two diameter-reduced portions. The other diameter-reduced portion of the auxiliary glass pipe was coupled with the effective glass rod. The diameter-reduced portion of the effective glass pipe was also coupled with the effective glass rod.

The dummy pipe and the auxiliary glass pipe were fusion-fixed at the fore-going diameter-reduced portion. An unfused portion was provided between the dummy pipe and the auxiliary glass pipe at the fixed portion. It was confirmed that a gas in the clearance between the effective glass pipe and the effective glass rod passed through the unfused portion at a flow rate of 1,000 mm$^3$/min.

Next, while $Cl_2$ was fed at a flow rate of $5\times10^5$ mm$^3$//min under STP from the gas-feeding tube 22 of the heating apparatus 20 shown in FIG. 1, and while the effective glass pipe and the effective glass rod were rotated, the effective glass pipe was heated at about 1,100° C. with the heat source 27. The heating removed water vapor and other impurities such as transition metals adhering to the inner surface of the effective glass pipe and the surface of the effective glass rod. The effective glass pipe and the effective glass rod were heated so as to attain a uniform temperature distribution along their circumferences at the diameter-reduced portion of the effective glass pipe to unify the two members. Immediately after the heat unification, the pressure inside the glass pipe was adjusted with the evacuating apparatus to −1.5 kPa in the reading on the pressure gauge. The heat source 27 was moved from the diameter-reduced portion of the effective glass pipe forward to the diameter-reduced portion where the dummy pipe was fixed to obtain a first glass body. During the heat unification, the moving speed of the heat source 27 was 30 mm/min, and the temperature of the heated portion was 1,510° C. While the heat unification was performed, $Cl_2$ and $O_2$ were fed at a rate of $3.0\times10^5$ mm$^3$//min under STP respectively from the gas-feeding tube of the heating apparatus.

The first glass body had a diameter of 24 mm. Appearance inspection revealed that the first glass body included no gas bubble. A measurement on the first glass body showed that it had a core noncircularity of at most 0.1% throughout its length, which was satisfactory.

After a structural inspection using a preform analyzer, the first glass body was drawn to attain a diameter of 10.8 mm by using the heat source 27. An auxiliary glass rod containing 1.4 weight % fluorine and having a diameter of 10.8 mm was fusion-connected to one end of the drawn first glass body to obtain a second glass body.

The second glass body was etched by a hydrofluoric acid to reduce the diameter to 5.5 mm. As described above, the second glass body was composed of the auxiliary glass rod and the first glass body. The auxiliary glass rod and the outermost layer of the first glass body contained the same concentration of doped fluorine. Consequently, the etching speed was nearly uniform over the entire circumference of the second glass body. As a result, the etching gave the second glass body a nearly uniform diameter of 5.5 mm throughout its length including the auxiliary glass rod. After the etching, the diameter ratio of the effective glass rod to become the core portion to the region to become the first cladding portion became 2.04. The etching removed OH groups and other impurities that had adhered to or penetrated into the surface region during the heating unification and the drawing. The surface region of the second glass body became clean.

Subsequently, a second effective glass pipe to become the second cladding portion was prepared. The second effective glass pipe was made of silica glass doped with 0.2 mol % Cl and had an inner diameter of 5.5 mm and an outer diameter of 30 mm. The second effective glass pipe was produced by the VAD method.

A second auxiliary glass pipe made of highly pure silica glass and having an inner diameter of 6.0 mm and an outer diameter of 30 mm was connected to one end of the second effective glass pipe. The second effective glass pipe to which the second auxiliary glass pipe was connected is hereinafter referred to as a second glass pipe. The inner surface of the second glass pipe was etched by heating and feeding of $SF_6$. The etching increased the inner diameter of the second glass pipe to 7.0 mm. Two diameter-reduced portions were formed at the second auxiliary glass pipe. One diameter-reduced portion was formed in the vicinity of the free end of the second effective glass pipe All the diameter-reduced portions had an inner diameter of 6.0 mm.

Next, a protective pipe made of Teflon and having an inner diameter of 5.6 mm and an outer diameter of 5.9 mm was prepared. The above-described etched second glass body was inserted into the protective pipe. Subsequently, the protective pipe into which the second glass body was inserted was inserted into the second glass pipe. Then, only the protective pipe was withdrawn from the second glass pipe. After the withdrawal, of the two diameter-reduced portions of the second auxiliary glass pipe, the one nearer to the free end of the second auxiliary glass pipe supported the auxiliary glass rod of the second glass body The other diameter-reduced portion of the second auxiliary glass pipe supported the first glass body. The diameter-reduced portion of the second effective glass pipe also supported the first glass body. The second glass body and the second glass pipe were mutually fixed by heat-fusing the auxiliary glass rod and the diameter-reduced portion nearer to the free end of the second auxiliary glass pipe. An unfused portion was provided at the fixed portion. It was confirmed that a gas passed through the unfused portion at a rate of 1,000 mm$^3$/min.

Next, while $Cl_2$ was fed at a flow rate of $5\times10^5$ mm$^3$//min under STP from the gas-feeding tube of the heating apparatus, the second glass pipe and the second glass body were heated at 1,100° C. with the heat source 27. The heating removed impurities adhering to the inner surface of the second glass pipe and the surface of the second glass body. Then, heat unification of the two members was performed. During the heat unification, the heat source 27 was moved from the diameter-reduced portion formed in the vicinity of the free end of the second effective glass pipe forward to the diameter-reduced portion of the second auxiliary glass pipe. The moving speed was 35 mm/min. While the heat unification was performed, $Cl_2$ was fed at a flow rate of $5.0\times10^5$ mm$^3$//min under STP from the gas-feeding tube. Immediately after the heat unification of the second effective glass pipe and the first glass body at the diameter-reduced portion of the second effective glass pipe, the pressure was reduced to −5.0 kPa in the reading on the pressure gauge. Thus, an optical fiber preform intermediate was obtained.

The optical fiber preform intermediate had a diameter of 29 mm. Appearance inspection revealed that the intermediate included no gas bubble. A measurement on the intermediate showed that it had a core noncircularity of at most 0.3% throughout its length, which was satisfactory.

After a structural inspection of the intermediate using a preform analyzer, a jacket portion containing 0.2 mol % Cl was synthesized by the OVD method onto the circumference of the intermediate to obtain an optical fiber preform. The Cl content of the jacket portion was nearly equal to that of the second effective glass pipe. Consequently, the synthesis of the jacket portion practically increased the thickness of the second cladding portion. The diameter ratio of the first cladding portion to the second cladding portion of the optical fiber preform was 15.8.

The obtained optical fiber preform was drawn by a specified method to produce an optical fiber having a diameter of 125 μm. Measurements of the transmission properties on the obtained optical fiber were conducted at a wavelength of 1,550 nm. The measured results are shown in Table V. The bending loss was measured by coiling the optical fiber at a diameter of 20 mm. Table V confirmed that the obtained optical fiber had excellent properties as a dispersion-compensating fiber. In particular, the optical fiber had a polarization mode dispersion of 0.02 ps/km$^{1/2}$. According to the findings of the present inventors, it is desirable that a dispersion-compensating fiber have a polarization mode dispersion of at most 0.15 ps/km$^{1/2}$ for large-capacity transmission, more desirably at most 0.05 ps/km$^{1/2}$. As shown above, the optical fiber produced by the above-described method has a polarization mode dispersion lower than those values. In other words, the obtained result demonstrates that the optical fiber produced from the optical fiber preform produced by the method explained in Example 8 has excellent properties.

TABLE V

| | |
|---|---|
| Transmission loss (dB/km) | 0.270 |
| Chromatic dispersion (ps/km/nm) | −47 |
| Dispersion slope (ps/km/nm$^2$) | −0.10 |
| Bending loss (dB/m) | 0.8 |
| Effective area (μm$^2$) | 21 |
| Mode field diameter (μm) | 5.7 |
| Cutoff wavelength (nm) | 870 |
| Polarization mode dispersion (ps/km$^{1/2}$) | 0.02 |

EXAMPLE 9

In Example 9, a plurality of optical fibers were produced by a procedure similar to that used in Example 8. The relationship between the polarization mode dispersion of the optical fibers and the core noncircularity of the optical fiber preforms used for the production of the optical fibers was studied. For this purpose, optical fiber preforms having a different core noncircularity ranging from 0.04% to 4% were intentionally produced as Comparative example 9. The optical fiber preforms having a relatively high core noncircularity were produced by some of the methods described above.

Every optical fiber was composed of a core region made of GeO$_2$-doped silica glass, a first cladding region made of fluorine-doped silica glass, and a second cladding region made of Cl-doped silica glass as shown in FIG. 10. The core region had a diameter of 4.0 μm, the first cladding region had a diameter of 7.9 μm, and the second cladding region had a diameter of 125 μm. The highest relative refractive-index difference Δ of the core region to the second cladding region was 1.50%, and that of the first cladding region to the second cladding region was −0.45%. These optical fibers had the following principal optical transmission properties at a wavelength of 1,550 nm: a chromatic dispersion of about −47 ps/km/nm, a dispersion slope of about −0.08 ps/km/nm$^2$, an effective area of about 20 μm$^2$, a cutoff wavelength of about 750 nm, and a transmission loss of about 0.27 dB/km.

When the optical fibers were produced by drawing the optical fiber preforms, the oscillated drawing method was employed, which has been proposed, for example, in the published Japanese patent applications Tokukaihei 6-171970 and Tokukaihei 9-243833. According to this method, a specified torsion given to the optical fiber forces it to twist at the glass-softened portion. This twisting gives the optical fiber a mode coupling between the two orthogonal polarization modes. As a result, the broadening of the input pulse due to the polarization dispersion becomes $1/(4LH)^{1/2}$ in comparison with the case where virtually no mode coupling between the polarization modes is produced due to the absence of the oscillation, where L denotes the length of the optical fiber in meters, and H denotes the number of turns of the optical fiber per meter. Therefore, an increase in H decreases the polarization mode dispersion.

Figure 11:
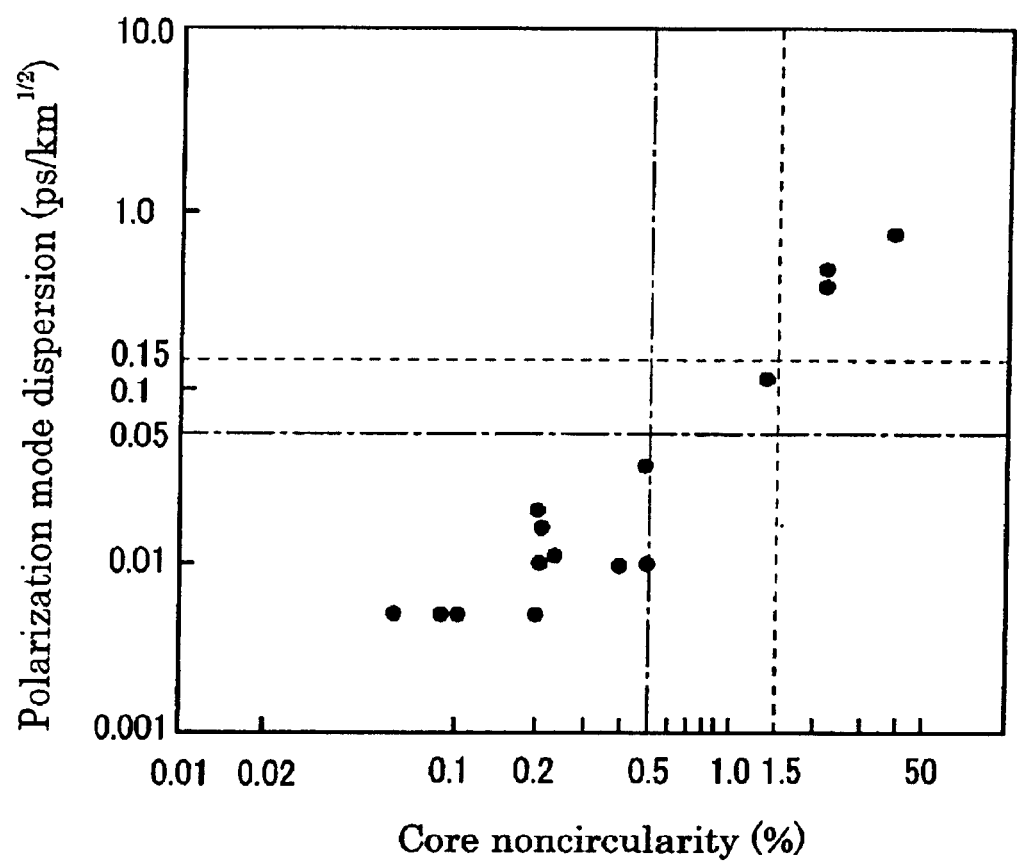
FIG. 11 is a graph showing the relationship between the core noncircularity of an optical fiber preform and the polarization mode dispersion of the optical fiber produced from the preform.

FIG. 11 is a graph showing the relationship between the core noncircularity eccentricity of an optical fiber preform and the polarization mode dispersion of the optical fiber produced from the preform. As can be seen from FIG. 11, when the optical fiber preform has a core noncircularity of at most 1.5%, the polarization mode dispersion is at most 0.15 ps/km$^{1/2}$, which is suitable for large-capacity transmission. When the preform has a core noncircularity of at most 0.5%, the polarization mode dispersion is at most 0.05 ps/km$^{1/2}$, which is more suitable.

The method for producing the optical fiber preform of the present invention is explained above by referring to some of the embodiments and examples. However, the present invention is not limited to the above-described embodiments and examples. There are a number of possible alternatives of the embodiments, as explained below.

In the third embodiment, two diameter-reduced portions are formed in the vicinity of one end of the glass pipe. In this case, three or more diameter-reduced portions may be formed in place of two. When three or more diameter-reduced portions are formed, it is desirable that the glass rod and the glass pipe be mutually fixed at a diameter-reduced portion other than the diameter-reduced portion farthest from the end of the glass pipe. On the other hand one of the two diameter-reduced portions may be formed at the auxiliary glass pipe and the other diameter-reduced portion may be formed at a glass pipe adjacent to the auxiliary glass pipe. In this case the center axis of the effective glass rod can be aligned with that of the effective glass pipe more accurately.

In some of the embodiments and examples, an auxiliary glass pipe made of highly pure silica glass is connected to one end or both ends of the effective glass pipe. This method is particularly suitable when the effective glass pipe is made of B$_2$O$_3$-doped silica glass or SiO$_2$-doped silica glass. When an effective glass pipe made of B$_2$O$_3$-doped silica glass or SiO$_2$-doped silica glass is provided with a diameter-reduced portion, if an effective glass rod or an auxiliary glass rod connected to an effective glass rod is fusion-fixed to the diameter-reduced portion, the diameter-reduced portion of the effective glass pipe develops considerable stresses and a multitude of resultant microcracks. As a result, the effective glass rod or the auxiliary glass rod connected to an effective glass rod may be detached from the diameter-reduced portion. On the other hand, when an auxiliary glass pipe made of highly pure silica glass is connected to an effective glass pipe made of B$_2$O$_3$-doped silica glass or SiO$_2$-doped silica glass, and when a diameter-reduced portion is formed at the auxiliary glass pipe, the above-described problem can be avoided. The material for the foregoing auxiliary glass pipe is not limited to highly pure silica glass; it may be fluorine- or Cl-doped silica glass.

In Example 8, a dummy pipe made of highly pure silica glass was slid onto one end of the effective glass rod. In this case, the inner diameter of the diameter-reduced portion formed at the auxiliary glass pipe was larger than that of the diameter-reduced portion formed at the effective glass pipe by two times the thickness of the dummy pipe. Thus, the center axes of the effective glass pipe and the effective glass rod were nearly aligned. On the other hand, in addition to one dummy pipe connected to one end of the effective glass rod, another dummy pipe having nearly the same outer diameter may be connected to the other end so that all the diameter-reduced portions can have nearly the same inner diameter.

The entire disclosure of Japanese Patent Application No. 2001-346511 filed on Nov. 12, 2001 including the specification, claims, drawings, and summary are incorporated herein by reference in its entirety.

What is claimed is:

1. A method for producing an optical fiber preform, the method comprising:
   (a) a preparing step in which a glass pipe, a glass rod, and a heat source are prepared;
   (b) a diameter-reduced-portion-forming step in which an inner diameter of the glass pipe is reduced at two longitudinal locations for forming a first diameter-reduced portion and a second diameter-reduced portion;
   (c) a glass-rod-inserting step in which the glass rod is inserted into the glass pipe;
   (d) a glass-rod-fixing step in which the glass rod is fixed to the glass pipe at the first diameter-reduced portion; and
   (e) a unifying step in which the glass pipe and the glass rod is heat-unified from the second diameter-reduced portion to the first diameter-reduced portion.

2. A method as defined by claim 1, wherein:
   (a) the glass pipe prepared in the preparing step comprises:
      (a1) an effective glass pipe to become a portion of the optical fiber preform;
      (a2) a first auxiliary glass pipe connected to one end of the effective glass pipe; and
      (a3) a second auxiliary glass pipe connected to the other end of the effective glass pipe; and
   (b) in the diameter-reduced-portion-forming step, the first diameter-reduced portion is formed at the first auxiliary glass pipe, and the second diameter-reduced portion is formed at the second auxiliary glass pipe.

3. A method as defined by claim 1, wherein:
   (a) in the preparing step, a protective pipe is further prepared; and
   (b) the glass-rod-inserting step is further specified by the steps of:
      (b1) inserting the glass rod into the protective pipe;
      (b2) inserting the protective pipe, into which the glass rod is inserted, into the glass pipe; and
      (b3) withdrawing the protective pipe from the glass pipe leaving the glass rod in the glass pipe.

4. A method as defined by claim 1, wherein in the diameter-reduced-portion-forming step, a third diameter-reduced portion is further formed at a location between the first and second diameter-reduced portions and adjacent to the first diameter-reduced portion.

5. A method as defined by claim 1, wherein in the glass-rod-fixing step, the glass rod is fixed to the glass pipe at the first diameter-reduced portion such that the first diameter-reduced portion is provided with an unfused portion between the glass pipe and the glass rod through which a gas can pass at a flow rate of V satisfying the equation $$V \geq \{(d_p/2)^2 \times \pi - (d_r/2)^2 \times \pi\} \times v,$$

where $d_p$ is the inner diameter of the glass pipe at the portion other than the diameter-reduced portions, $d_r$ is the diameter of the glass rod, and v is the moving speed of the heat source.

6. A method as defined by claim 1, wherein in the preparing step, the glass pipe and the glass rod are prepared such that after the insertion of the glass rod into the glass pipe in the glass-rod-inserting step, each of the glass pipe and the glass rod facing each other at the first diameter-reduced portion is made of a material selected from the group consisting of highly pure silica glass, fluorine-doped silica glass, diphosphorus pentaoxide-doped silica glass, and chlorine-doped silica glass.

7. A method as defined by claim 1, wherein:
   (a) the glass rod prepared in the preparing step comprises an effective glass rod at least one end of which is connected to an auxiliary glass member made of a material selected from the group consisting of highly pure silica glass, fluorine-doped silica glass, diphosphorus pentaoxide-doped silica glass, and chlorine-doped silica glass, the effective glass rod being to become a portion of the optical fiber preform; and
   (b) in the glass-rod-fixing step, the auxiliary glass member is fixed to the glass pipe at the first diameter-reduced portion.

8. A method as defined by claim 7, wherein:
   (a) the auxiliary glass member is a third auxiliary glass pipe; and
   (b) the effective glass rod is connected to the third auxiliary glass pipe by inserting the effective glass rod into the third auxiliary glass pipe.

9. A method as defined by claim 1, wherein the first and second diameter-reduced portions and the glass rod have a dimensional relationship expressed as $$d_r < D \leq d_r + 1 (mm),$$

where D is the inner diameter of the first and second diameter-reduced portions, and $d_r$ is the diameter of the glass rod.

10. A method as defined by claim 1, wherein the glass pipe and the glass rod have a dimensional relationship expressed as $$0.1(mm) \leq (d_p - d_r)/2 \leq 3(mm),$$

where $d_p$ is the inner diameter of the glass pipe, and $d_r$ is the diameter of the glass rod.

11. A method for producing an optical fiber preform, the method comprising:
   (a) a preparing step in which:
      (a1) an effective glass pipe to become a portion of the optical fiber preform, an auxiliary glass pipe, an effective glass rod to become a portion of the optical fiber preform, an auxiliary glass member made of a material selected from the group consisting of highly pure silica glass, fluorine-doped silica glass, diphosphorus pentaoxide-doped silica glass, and chlorine-doped silica glass, and a heat source are prepared;
      (a2) a glass pipe is assembled by connecting the auxiliary glass pipe to one end of the effective glass pipe; and
      (a3) a glass rod is assembled by connecting the auxiliary glass member to one end of the effective glass rod;
   (b) a diameter-reduced-portion-forming step in which a first diameter-reduced portion is formed at the auxiliary glass pipe, and a second diameter-reduced portion is formed in the vicinity of the effective glass pipe's end to which no auxiliary glass pipe is connected;

(c) a glass-rod-inserting step in which the glass rod is inserted into the glass pipe;

(d) a glass-rod-fixing step in which the auxiliary glass member is fixed to the glass pipe at the first diameter-reduced portion; and (e) a unifying step in which the glass pipe and the glass rod is heat-unified from the second diameter-reduced portion to the first diameter-reduced portion.

12. An optical fiber preform, being produced by the method comprising:

(a) a preparing step in which a glass pipe, a glass rod, and a heat source are prepared;

(b) a diameter-reduced-portion-forming step in which an inner diameter of the glass pipe is reduced at two longitudinal locations for forming a first diameter-reduced portion and a second diameter-reduced portion;

(c) a glass-rod-inserting step in which the glass rod is inserted into the glass pipe;

(d) a glass-rod-fixing step in which the glass rod is fixed to the glass pipe at the first diameter-reduced portion; and (e) a unifying step in which the glass pipe and the glass rod is heat-unified from the second diameter-reduced portion to the first diameter-reduced portion; the optical fiber preform having a core noncircularity of at most 1.5%.

13. An optical fiber, being produced from an optical fiber preform having a core noncircularity of at most 1.5%; the optical fiber preform being produced by the method comprising:

(a) a preparing step in which a glass pipe, a glass rod, and a heat source are prepared;

(b) a diameter-reduced-portion-forming step in which an inner diameter of the glass pipe is reduced at two longitudinal locations for forming a first diameter-reduced portion and a second diameter-reduced portion;

(c) a glass-rod-inserting step in which the glass rod is inserted into the glass pipe;

(d) a glass-rod-fixing step in which the glass rod is fixed to the glass pipe at the first diameter-reduced portion; and (e) a unifying step in which the glass pipe and the glass rod is heat-unified from the second diameter-reduced portion to the first diameter-reduced portion; the optical fiber having a polarization mode dispersion of at most $0.15 \text{ ps/km}^{1/2}$ at a wavelength of 1,550 nm.

* * * * *